Nov. 2, 1971   G. H. DIMOND   3,616,513
CAPPING EQUIPMENT
Filed April 21, 1969   11 Sheets-Sheet 6
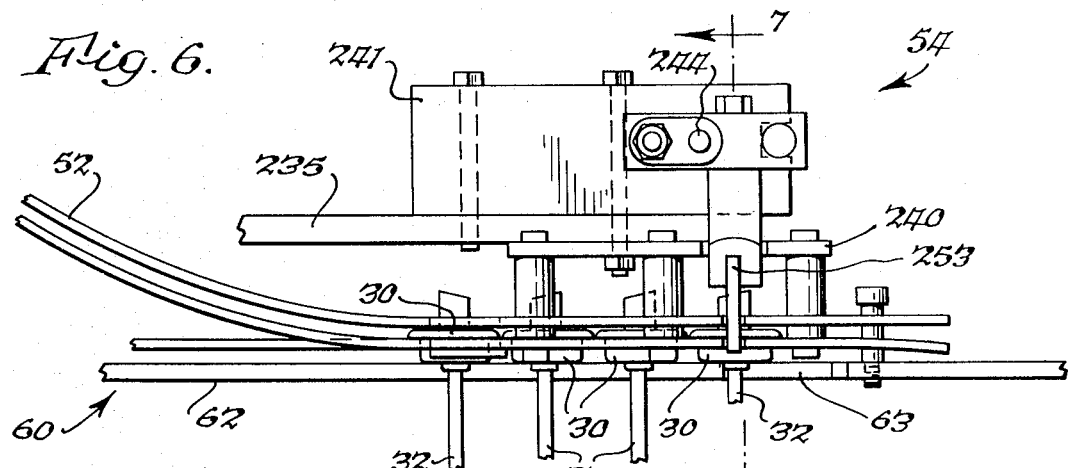
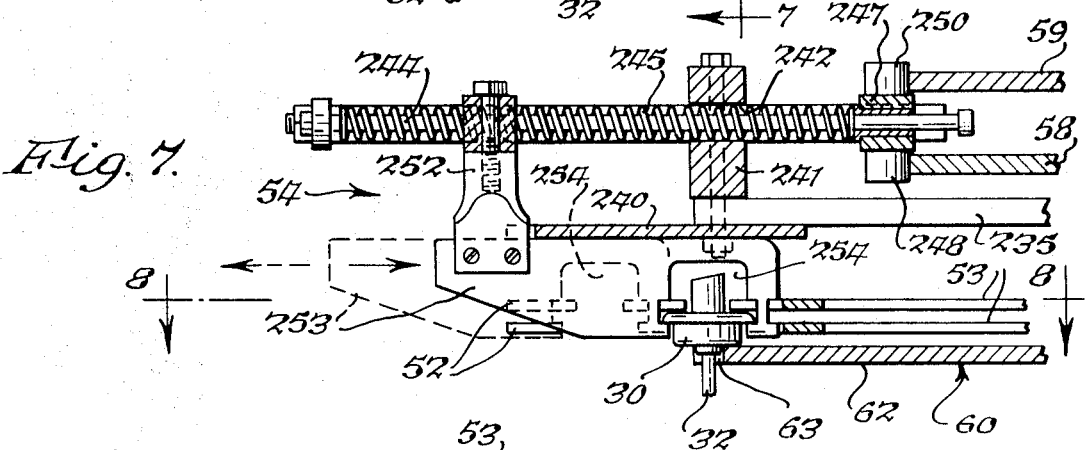
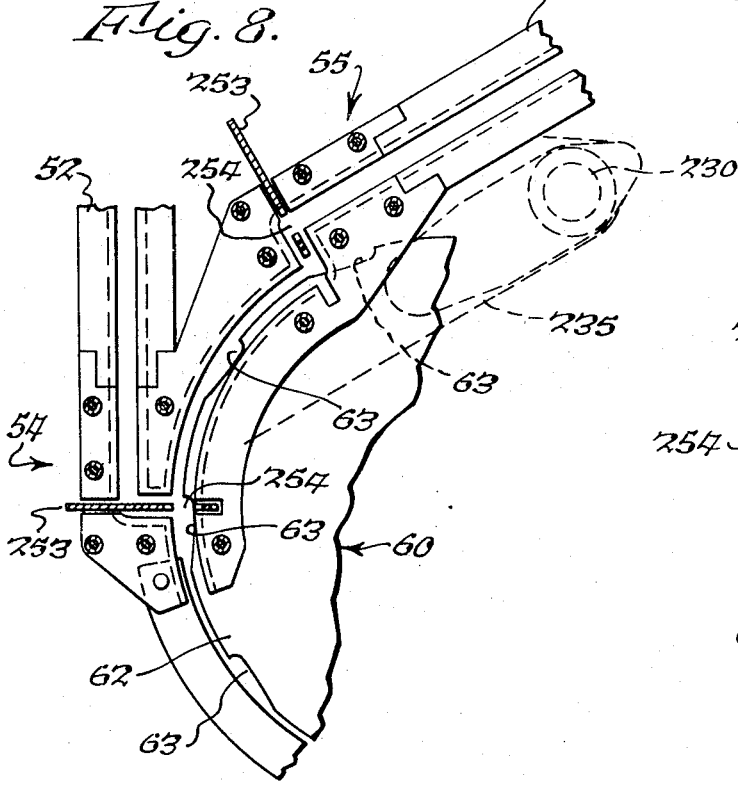
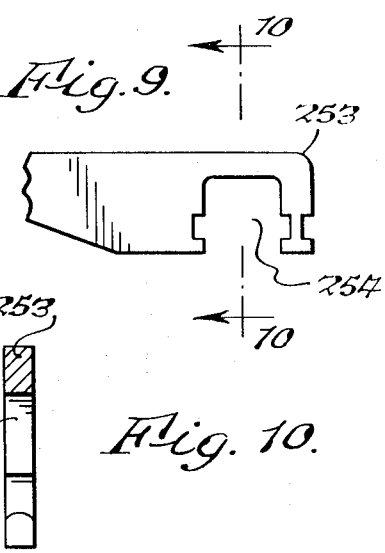
INVENTOR
George H. Dimond

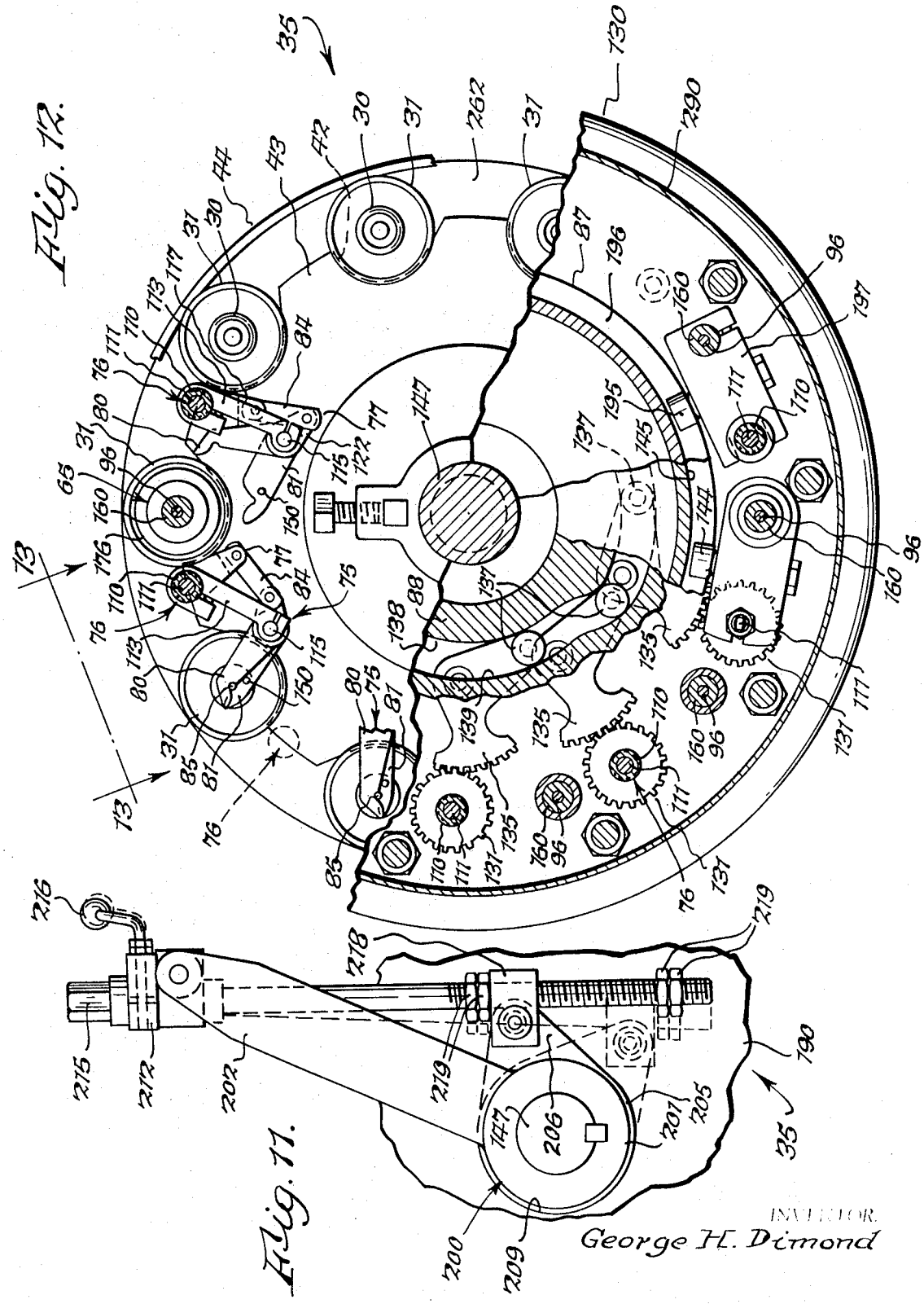

Nov. 2, 1971  G. H. DIMOND  3,616,513
CAPPING EQUIPMENT
Filed April 21, 1969  11 Sheets-Sheet 8
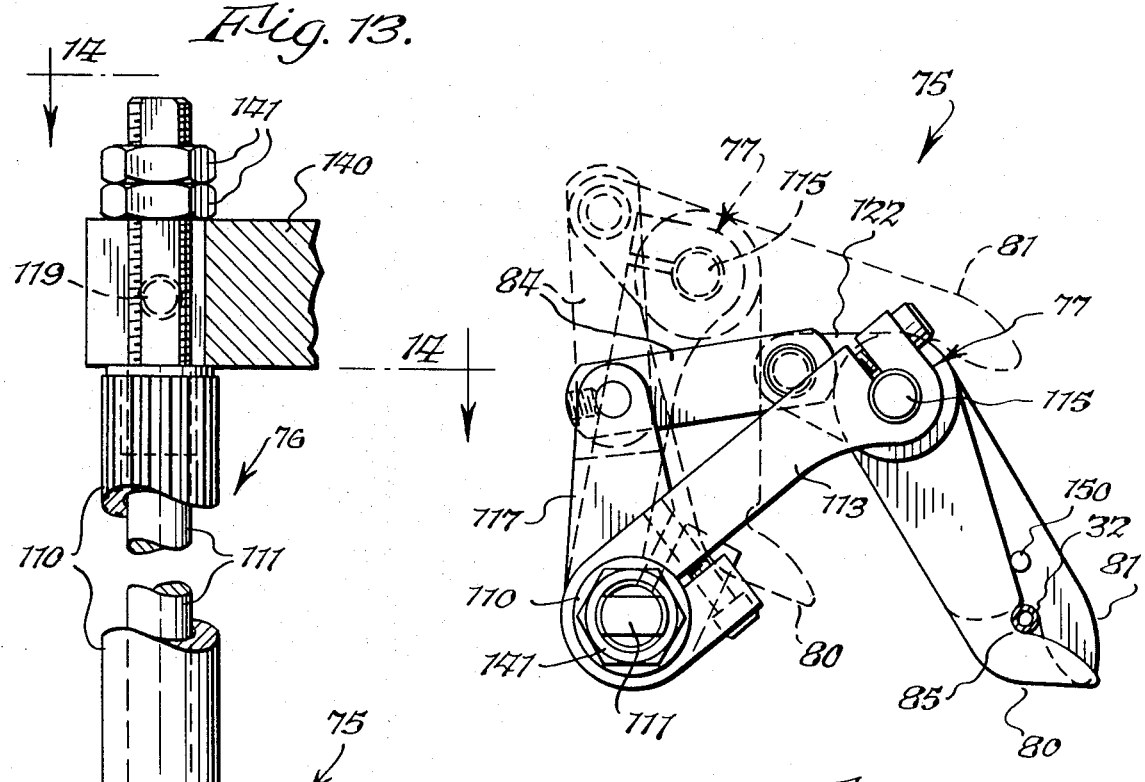
Fig. 13.
Fig. 14.
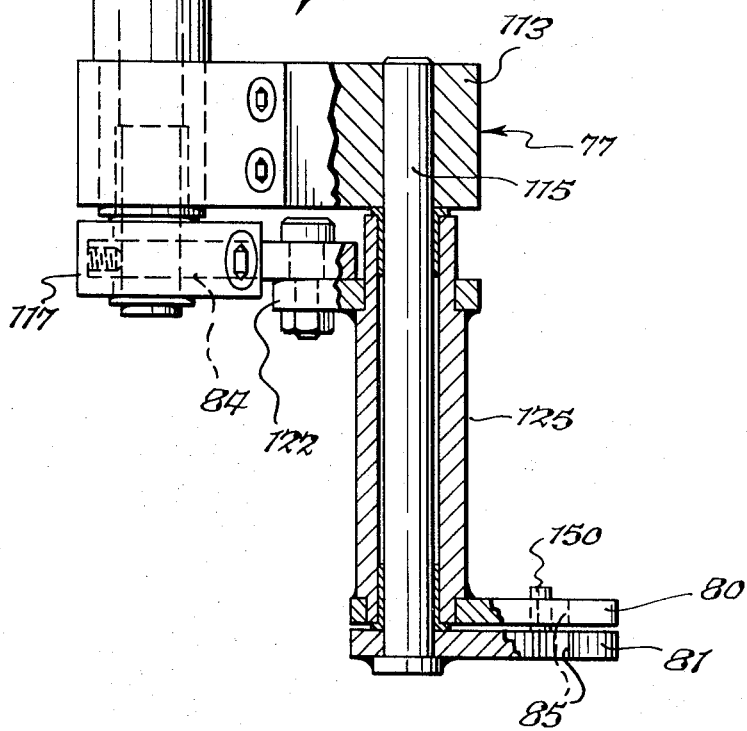
INVENTOR
George H. Dimond

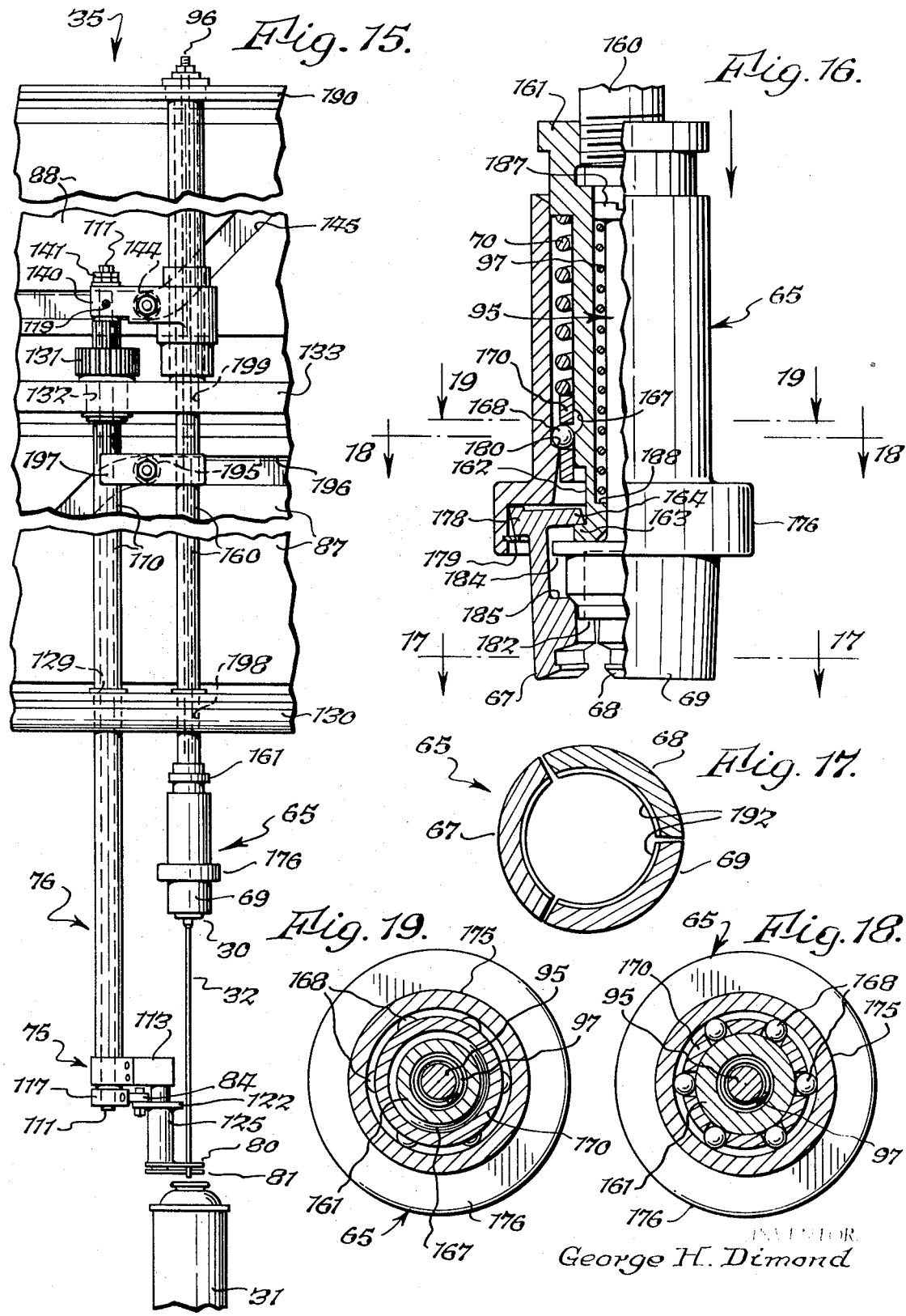

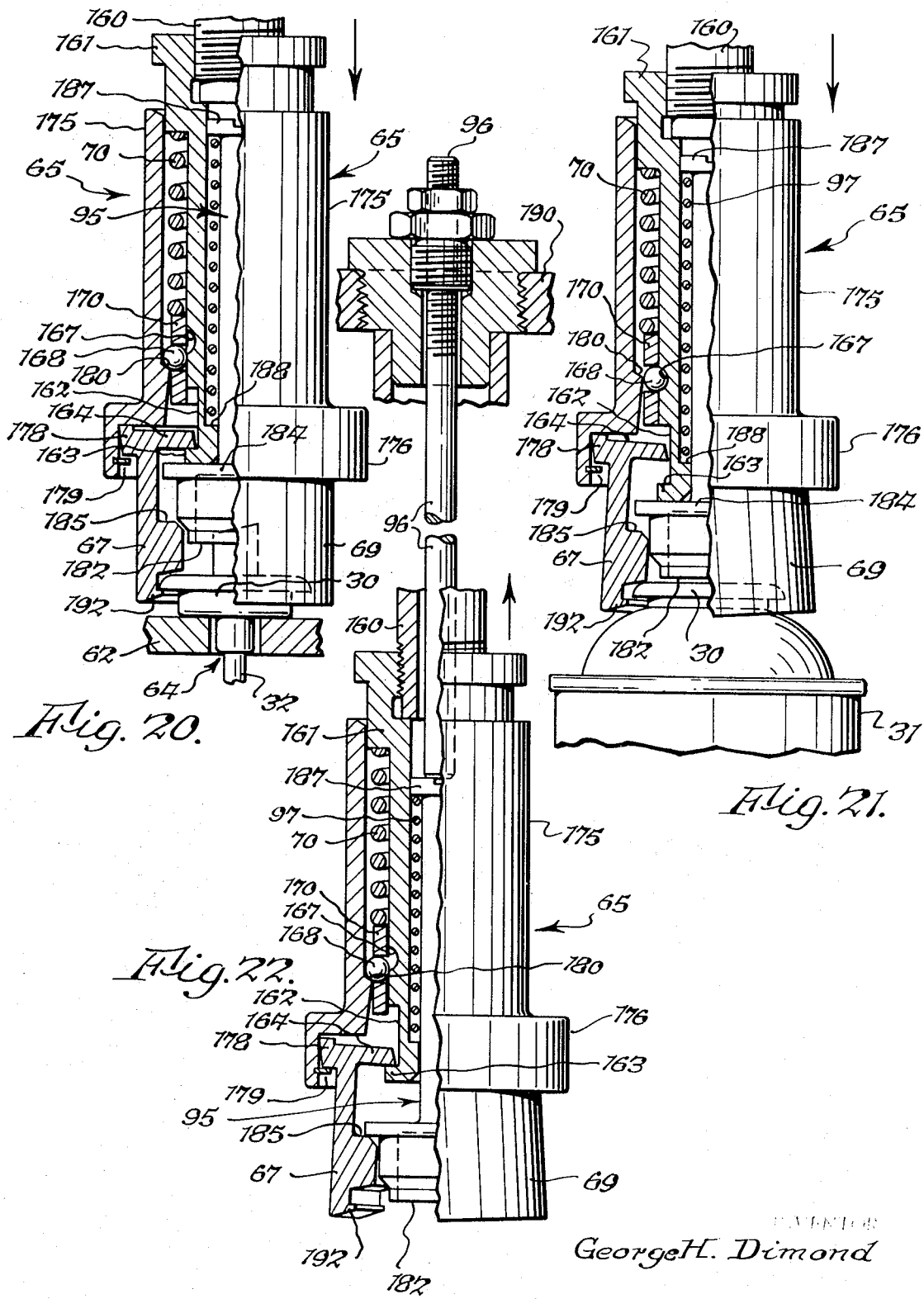

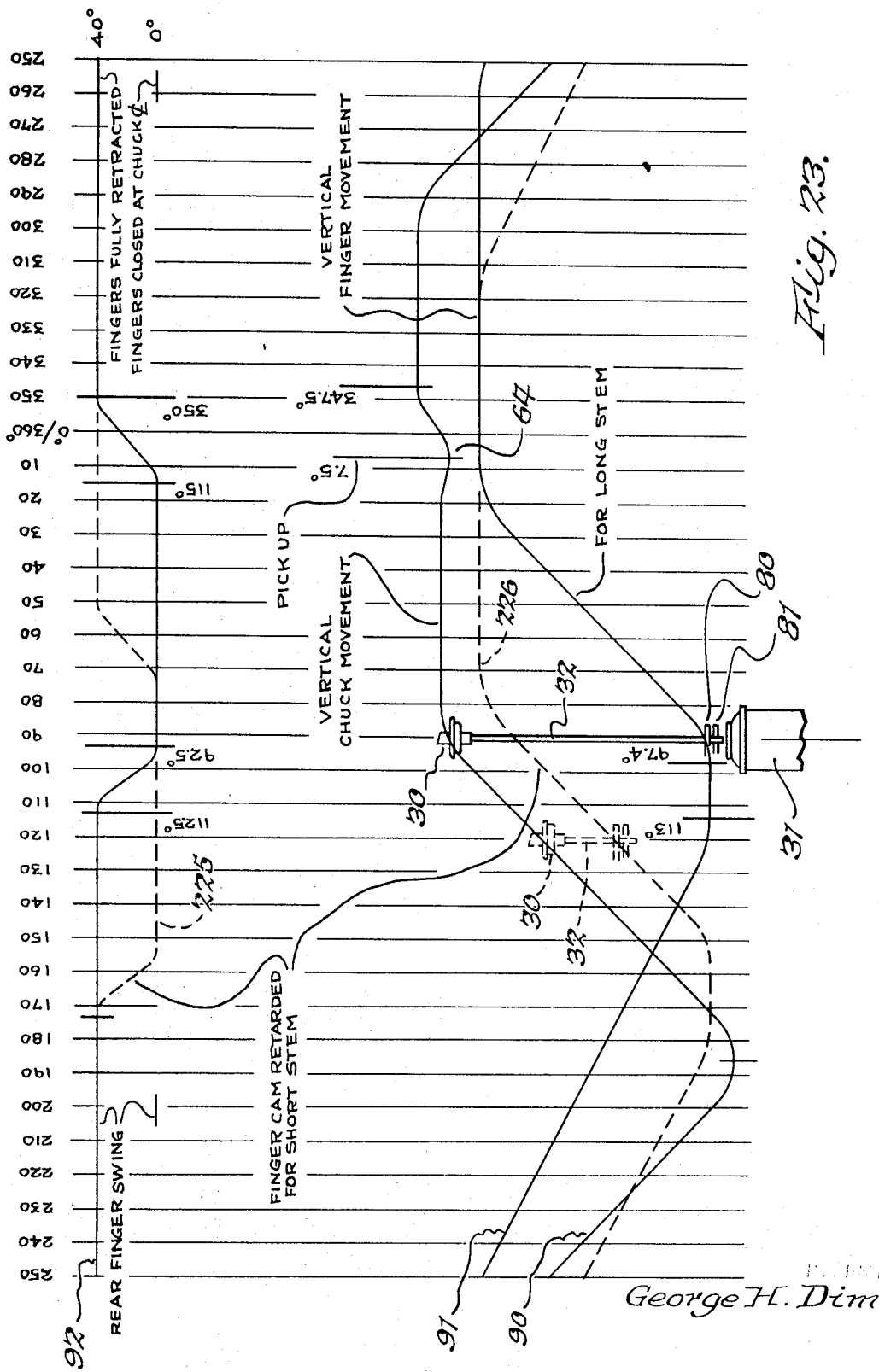

United States Patent Office 3,616,513
Patented Nov. 2, 1971

3,616,513
CAPPING EQUIPMENT
George H. Dimond, East Aurora, N.Y., assignor to Consolidated Packaging Machinery Corporation, Buffalo, N.Y.
Filed Apr. 21, 1969, Ser. No. 817,850
Int. Cl. B23p *19/04*
U.S. Cl. 29—208 B                         31 Claims

ABSTRACT OF THE DISCLOSURE

A machine for applying closure elements having dip tube extensions to aerosol containers which includes a multi-station rotary turret arranged to receive the containers from an infeed conveyor. A pair of spaced-apart sorters are provided for alternately feeding the closure elements to a feeding mechanism which directs the elements to a predetermined pick-up location adjacent the turret. A plurality of capping chucks mounted on the turret receive successive closure elements from the pick-up location, and each chuck is effective to grip its element through the use of a plurality of spring biased chuck jaws. When a given chuck picks up a closure element, an extension guide mechanism adjacent the chuck is effective to move two overlapping finger members around the upper portion of the dip tube extension. The finger members are then directed downwardly along the extension to a position immediately above one of the containers on the turret, and the chuck descends until the extension has entered the mouth of the container, at which point the finger members move out of the way. Upon continued downward movement of the chuck, the spring biased chuck jaws resiliently urge the closure element into seating engagement with the container.

BACKGROUND OF THE INVENTION

This invention relates to machines for applying closure elements to containers and more particularly to machines for directing dip tubes or other extensions of the closure elements into the containers during the closure applying operation.

In certain types of machines for applying closure elements having dip tube extensions to aerosol cans, for example, there is employed a rotary turret having a series of capping stations around its periphery. A vertically reciprocable chuck at each station receives a closure element from a suitable supply and is effective to seat the element on a container. The machines also include a guide mechanism adjacent each chuck for making sure that the dip tube extension enters the mouth of the container.

Heretofore, difficulties have been encountered in the provision of machines for applying closure elements having extensions to their containers. For example, in many types of prior machines the dip tubes or other extensions of the closure elements occasionally slipped from the guide mechanisms or otherwise were not properly guided during the downward movement of the elements toward the containers. This difficulty has been of special moment in cases in which the dip tubes were of varying lengths, with the result that the lower ends of particularly the shorter tubes did not enter the container. In addition, in many machines of the type previously employed difficulties arose in ensuring that each chuck was effective to properly seat its closure element on the container and yet release the element at the appropriate point in the machine cycle. Still other difficulties resulted from the use of containers, dip tubes, etc., of widely varying sizes, and it often was necessary to make complicated and time-consuming adjustments or to use different size machines to accommodate these variations. Furthermore, the speed of the machines used heretofore in many instances was substantially less than the desired speed, and this resulted at least in part because of limitations in the rate at which the closure elements could be fed to the individual chucks.

One general object of this invention, therefore, is to provide a new and improved machine for applying closure elements having extensions to a series of containers presented therebeneath.

More specifically, it is an object of this invention to provide a machine of the character indicated which ensures the positive and accurate guiding of extensions which vary widely in length.

Another object of this invention is to provide such a machine in which the lower ends of the extensions are maintained in accurate alignment with the containers during the closure applying operation.

A further object of the invention is to provide a machine of the foregoing type in which each closure element is firmly seated on its container by the jaws of the chuck and is automatically released at the appropriate point in the machine cycle.

A still further object of this invention is to provide a closure applying machine which may be readily adapted to accommodate closure elements and containers of widely varying sizes and shapes.

Still another object of this invention is to provide a machine for applying closure elements to containers at an increased rate.

An additional object of this invention is to provide a closure applying machine utilizing comparatively simple mechanical components which is economical to manufacture and thoroughly reliable in operation.

SUMMARY

In one preferred embodiment of the invention, the machine includes a rotary turret for receiving successive containers from a suitable infeed conveyor. A plurality of vertically reciprocable chucks are mounted on the turret and are respectively positioned above and in substantial vertical alignment with the containers. A plurality of vertically reciprocable extension guide mechanisms, one for each chuck, also are mounted on the turret. The closure elements for the containers are led by a unique feed mechanism to a predetermined pick-up position adjacent the turret and are gripped by the successive chucks. The chucks then move downwardly toward the containers, and during this downward movement the extensions on the gripped closure elements are guided into the mouths of the containers by the guide mechanisms. As each chuck approaches its lowermost position, the corresponding guide mechanism moves out of the way, and the chuck applies positive seating force to the closure element to position it on the container.

In accordance with one feature of several advantageous embodiments of the invention, each of the guide mechanisms is moved into guiding relationship with the upper portion of the closure extension, and the mechanism then descends toward the container. As the chuck is directed downwardly to insert the extension into the container, positive guiding action is provided for extensions which vary widely in length.

In accordance with another feature of the invention, in certain prefered embodiments, each of the guide mechanisms includes two finger members which are controlled in a manner such that one of the finger members positions the extension of the closure element over the container prior to the time the other finger member is brought into guiding relationship with the extension. With this arrangement, the alignment of the extension begins at a considerably earlier point in the operation cycle, and extremely accurate guiding action is assured.

In accordance with a further feature of the invention, in certain good arrangements, each of the chucks includes jaw means adjacent its lower end and a spring member for maintaining the jaw means in gripping engagement with a closure element during the downward movement of the chuck. As the closure element contacts its container, the spring member also exerts a resilient vertical seating force on the jaw means, and this seating force is continued subsequent to the time the gripping engagement between the jaw means and the closure element is released. As a result, the closure element is affirmatively seated on the container, and the possibility of inadvertently retaining the element within the jaw means following such seating is substantially eliminated.

In accordance with still another feature of certain embodiments of the invention, there is provided unique means for controlling the vertical reciprocable movement of the chucks and the extension guide mechanisms. The control means is readily adjustable to vary the timed relationship between such movement in accordance with the size and shape of the particular containers, closure extensions, etc., being used.

In accordance with a still further feature of the invention, in some embodiments, there is provided a pair of spaced-apart supply means containing the closure elements, and means for alternately feeding elements from the respective supply means to the pick-up position adjacent the turret. The arrangement is such that the speed of the machine no longer is limited by the rate at which a single supply feeds the closure elements to the turret, with the result that the elements are applied to their containers at a rate which is considerably in excess of that attainable heretofore.

BRIEF DESCRIPTION OF THE DRAWINGS

The present invention, as well as further objects and features thereof, will be understood more clearly and fully from the following detailed description of a preferred embodiment, when read in conjunction with the accompanying drawings, in which:

FIG. 6 is an end elevational view of one of the two transfer mechanisms of the machine for advancing the closure elements to the infeed mechanism;

FIG. 7 is a fragmentary vertical sectional view taken along the line 7—7 in FIG. 6;

FIG. 8 is a fragmentary horizontal sectional view taken along the line 8—8 in FIG. 7;

FIG. 9 is an enlarged detail view of one of the components of the mechanism shown in FIGS. 6–8;

FIG. 10 is a vertical sectional view taken along the line 10—10 in FIG. 9;

FIG. 11 is a fragmentary plan view of the top of the turret showing a portion of the adjustment mechanism for the machine;

FIG. 12 is a plan view of the turret, with portions shown broken away and in section to illustrate the internal structure at different levels;

FIG. 13 is an enlarged elevation view, with certain parts broken away and in section, of a portion of one of the extension guide mechanisms of the machine, as seen from the line 13—13 in FIG. 12;

FIG. 14 is a horizontal sectional view taken along the line 14—14 in FIG. 13;

FIG. 15 is a vertical elevational view of a portion of the turret with the cover removed to show the internal structure, including a representative chuck and its associated extension guide mechanism;

FIG. 16 is an enlarged vertical sectional view of the chuck, with one side of the chuck shown in elevation;

FIG. 17 is a horizontal sectional view taken along the line 17—17 in FIG. 16;

FIG. 18 is a horizontal sectional view taken along the line 18—18 in FIG. 16;

FIG. 19 is a horizontal sectional view taken along the line 19—19 in FIG. 16;

FIG. 20 is a view similar to FIG. 16 but showing certain of the components of the chuck in different positions, together with a representative closure element;

FIG. 21 is a view similar to FIGS. 16 and 20 but showing certain of the components of the chuck in still different positions and illustrating the closure element as it is applied to a container;

FIG. 22 is a view similar to FIGS. 16, 20 and 21 but showing certain components of the chuck in still further positions, together with a cooperating stripper mechanism mounted on a turret; and FIG. 23 is a diagrammatic representation of the vertical and angular positions of the chucks and guide mechanisms.

DESCRIPTION OF A PREFERRED EMBODIMENT

Figure 1:
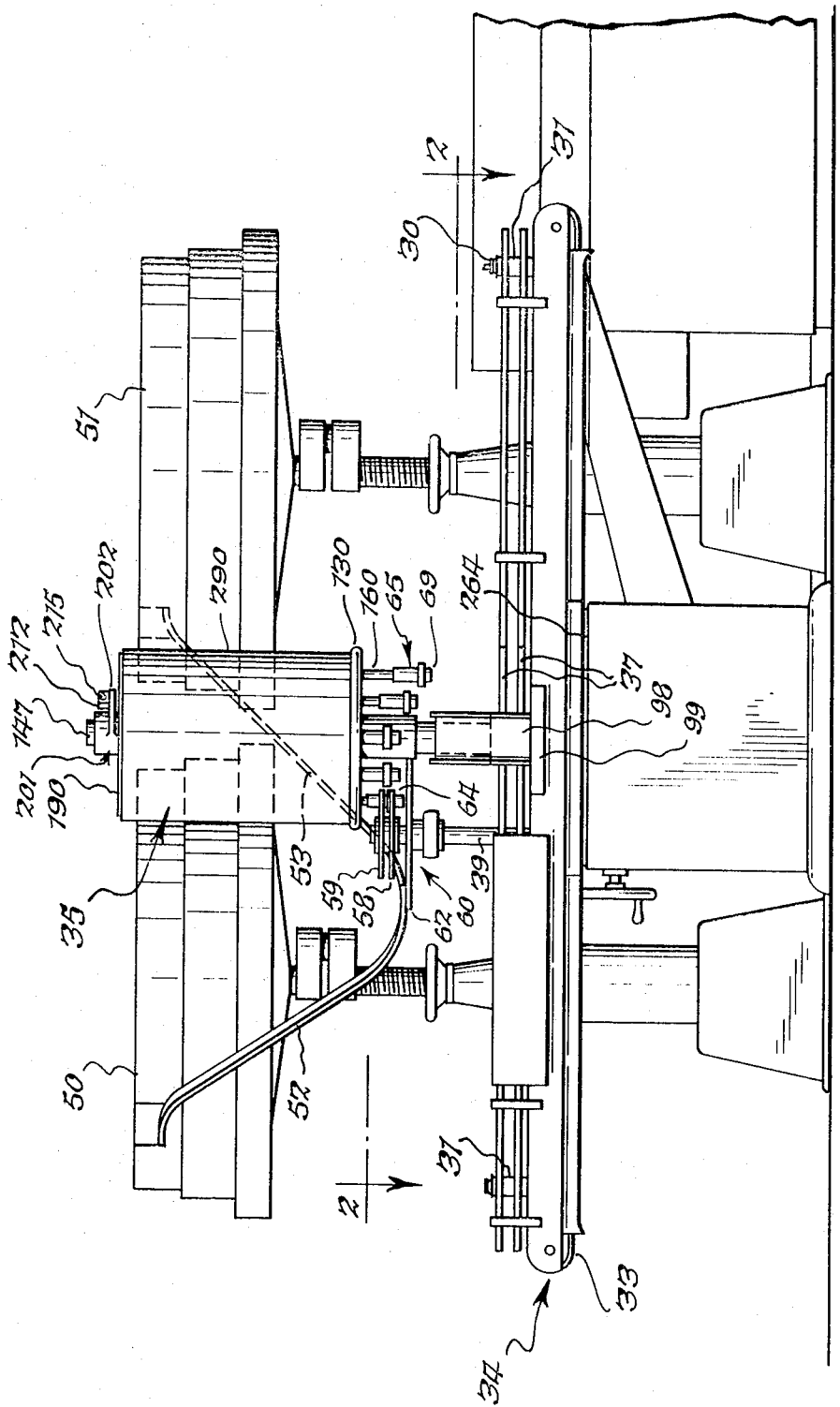
FIG. 1 is a side elevational view of a machine for applying closure elements to containers in accordance with an illustrative embodiment of the invention.

Referring to the drawings, there is shown a machine for applying closure elements, such as the valves 30 (FIG. 5), to a series of aerosol cans 31 or other containers. Each of the valves 30 includes a dip tube extension 32 which customarily is of a flexible plastic material. The machine is adapted to guide the lower ends of the dip tube extensions in the mouths of the cans and to then seat the valves in position.

In order to facilitate the detailed description of the machine illustrated in the drawings, there will first be given a discussion of the general mode of operation of the machine. That is, before describing the construction and arrangement of the various parts of the machine, a description will be given of its overall function in guiding the dip tube extensions 32 and applying the valves 30 to the cans 31.

GENERAL OPERATION

The cans 31 to which the valves 30 are to be applied are either automatically or manually deposited one by one on an elongated belt 33 which forms a part of a container feeding mechanism 34. The belt 33 advances the incoming cans 31 from left to right, as viewed in FIGS. 1 and 2, toward a continously rotating turret 35. As the incoming cans moved forward, they are uniformly spaced on the belt by the usual rotating helicoid 36 which extends along one side of the belt adjacent the infeed side of the turret.

Figure 2:
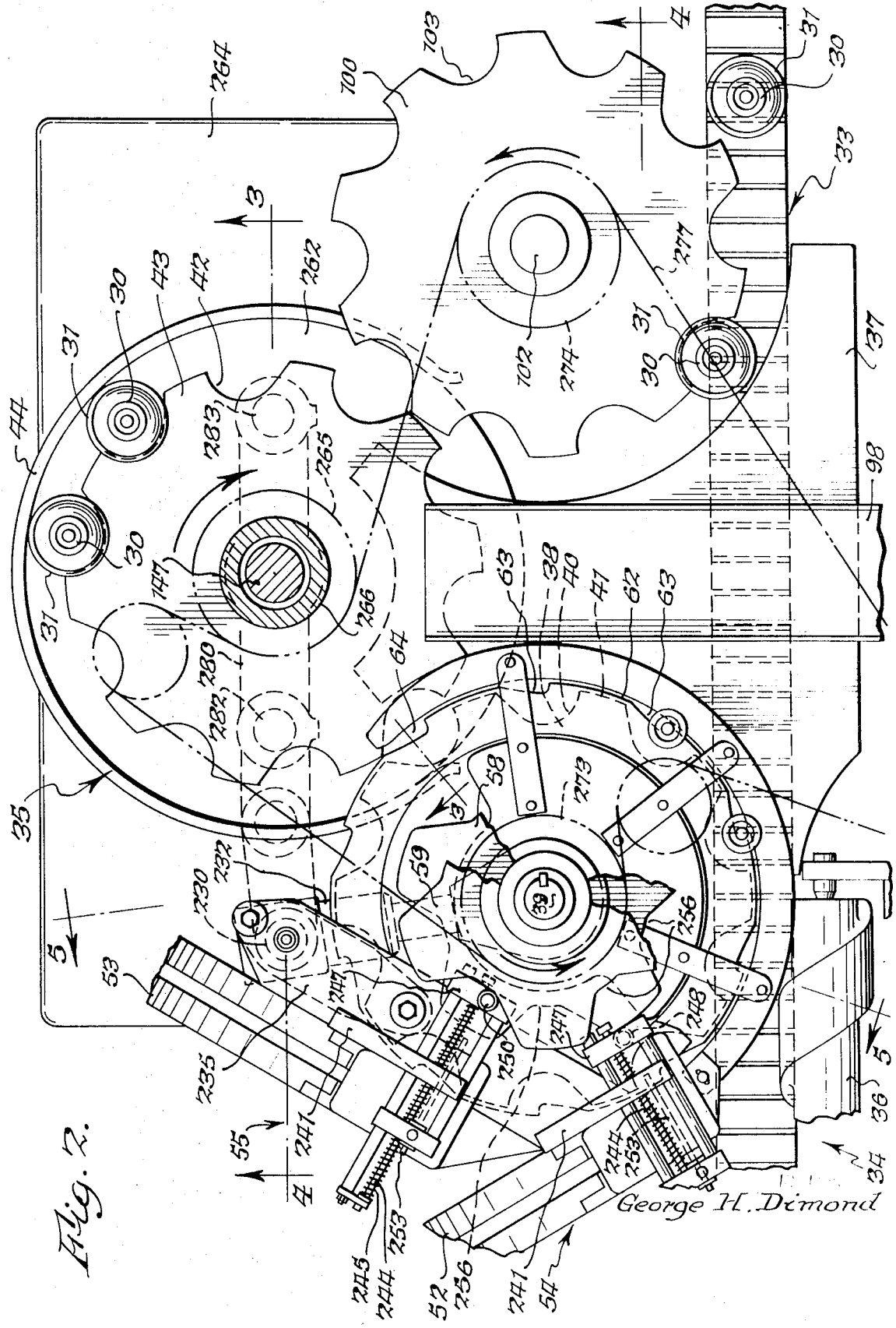
FIG. 2 is a horizontal sectional view taken along the line 2—2 in FIG. 1, with certain parts shown broken away.

The incoming cans 31 moving toward the turret 35 strike the arcuate edges of two fixed guide plates 37, only one of which is visible in FIG. 2. The plates 37 are mounted one above the other adjacent the central portion of the feeding mechanism 34 and serve to direct the cans toward a pair of star wheels 38 which preferably are fabricated from plastic or similar material. The star wheels 38 are coaxially positioned on a vertical shaft 39 adjacent the infeed side of the turret 35 and are continuously rotated in a counterclockwise direction, as viewed in FIG. 2. Each of these wheels includes ten arcuate recesses 40 of a configuration which generally conforms with a portion of the periphery of the cans to be capped. The recesses 40 form a series of equally spaced teeth 41 on the star wheels 38 which engage the incoming cans and transfer them from the belt 33 to the turret 35.

As the incoming cans 31 move onto the rotating turret 35, the cans are contacted by the teeth formed by the arcuate recesses 42 of two star wheels 43. The star wheels 43 are mounted one above the other in coaxial relationship with the turret 35 and carry the incoming cans clockwise around a major portion of the turret periphery. Two fixed curved rails 44 are concentric with the turret and serve to hold the cans in the recesses 42 as the star wheels 43 rotate.

During the time the container feeding mechanism 34 is effective to position the cans 31 on the rotating turret 35, successive valves 30 are led to the turret from a supply which comprises a pair of cap sorters 50 and 51 (FIG. 1). The sorters 50 and 51 are of conventional construction and are arranged to orient the valves 30 in an upright position with their dip tube extensions 32 protruding downwardly. The thus oriented valves move down two chutes 52 and 53 from the respective sorters 50 and 51 and are received by transfer mechanisms 54 and 55 (FIG. 2) at the lower ends of the chutes.

Figure 5:
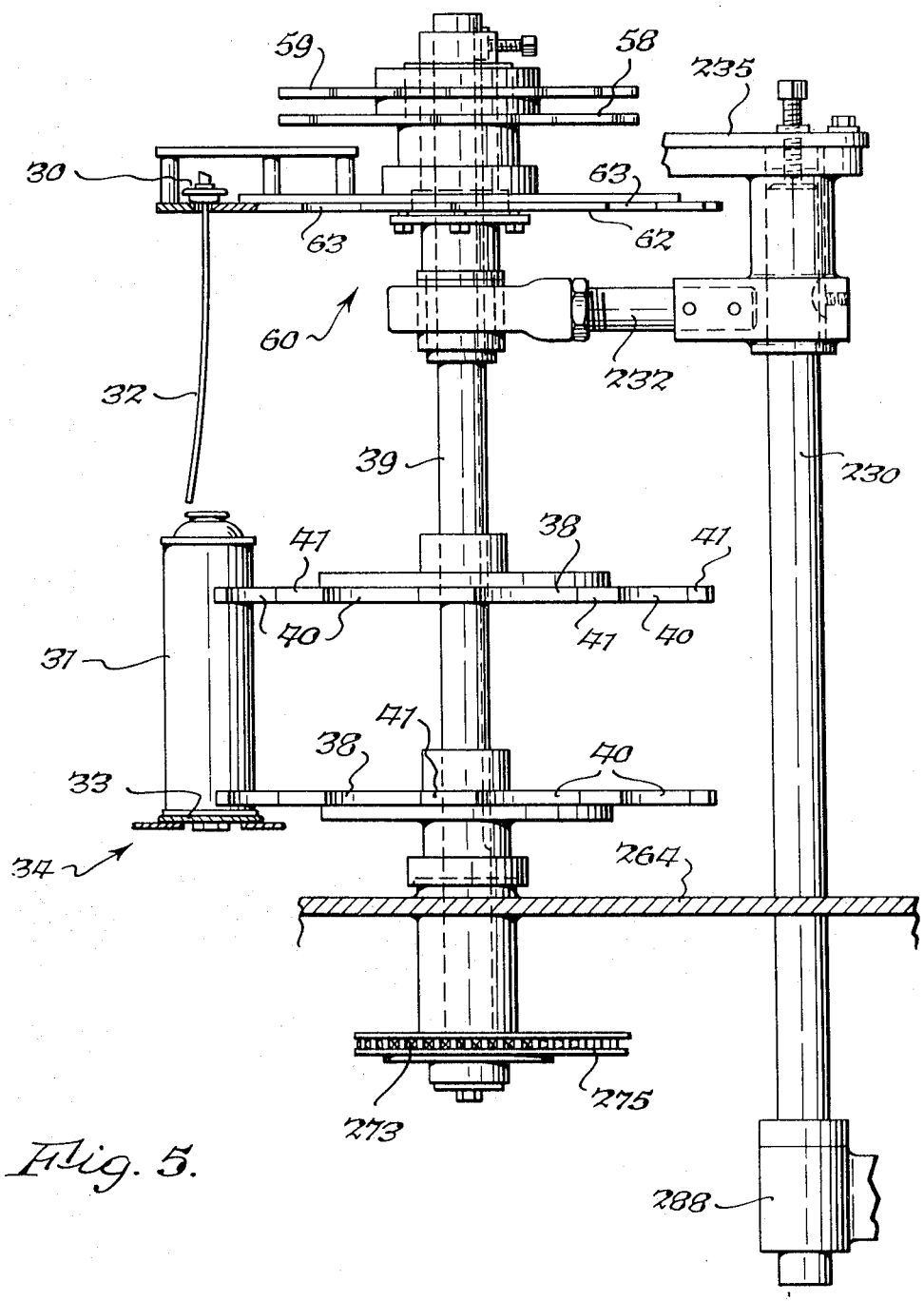
FIG. 5 is a vertical sectional view taken along the line 5—5 in FIG. 2 and showing portions of the infeed mechanism for the closure elements and the containers.

The transfer mechanisms 54 and 55 are alternately operated under the control of two cams 58 and 59. As best shown in FIG. 5, these cams are mounted one above the other adjacent the upper end of the star wheel shaft 39 and are effective to discharge successive valves 30 from first one chute and then the other onto a feeding mechanism 60. The mechanism 60 includes a valve star wheel 62 which is affixed to the star wheel shaft 39 between the lowermost cam 58 and the upper can star wheel 38. Ten equally spaced recesses 63 are provided around the periphery of the valve star wheel 62 for the incoming valves. The star wheel 62 is rotated in a counterclockwise direction, as viewed in FIG. 2, to carry the valves from adjacent the transfer mechanisms 54 and 55 to a predetermined pick-up location 64 adjacent the periphery of the turret 35.

The turret 35 includes ten vertically reciprocable chucks 65 which are best shown in FIGS. 15-17. The chucks 65 are equally spaced around the periphery of the turret and are each provided with three jaw members 67, 68 and 69 adjacent its lower end and an elongated coil spring 70. As will become more fully apparent hereinafter, the spring 70 maintains the jaw members 67, 68 and 69 in gripping engagement with the valve and additionally exerts a vertical seating force on the jaw members to firmly position the valve on its container.

Also mounted on the turret 35 are ten equally spaced extension guide mechanisms 75 (FIGS. 13-15). One of the mechanisms 75 is provided for each of the chucks 65 and is positioned adjacent the chuck on the side thereof toward the direction of rotation of the turret. Each of the mechanisms 75 includes a vertically reciprocable spindle portion 76, a lower offset portion 77 and a pair of overlapping finger members 80 and 81. The finger member 80 is pivotally connected to the spindle portion 76 by a linkage arm 84, while the finger member 81 is arranged for movement in fixed relationship with the spindle portion. As the finger members 80 and 81 move toward and away from each other in response to pivotal movement of the spindle portion 76, the members periodically form a guide aperture 85 therebetween.

The vertical reciprocable movement of the chucks 65 relative to the turret 35 is controlled by a stationary cylindrical cam 87 (FIG. 3) concentric with the turret. The extension guide mechanisms 75 similarly are mounted on the turret for vertical reciprocable movement, as well as for pivotal movement about the axes of the spindle portions 76, under the control of a stationary cylindrical cam 88. The vertical dispositions of the chucks 65 and the guide mechanisms 75 as the turret rotates are illustrated schematically in FIG. 23 by the curves 90 and 91, respectively, while the horizontal angular disposition of each of the mechanisms 75 is shown by the curve 92. In these figures the abscissas for the various points on the curves are measured in terms of degrees of rotation of the turret from a zero or reference position corresponding to the pick-up location 64 (FIG. 2). The ordinates for the points on the curve 92 are measured in terms of degrees of rotation of the spindle portion 76 about its axis from a closed position in which the finger members 80 and 81 are in contact with each other.

During normal operation of the machine, as each successive chuck 65 passes over a valve 30 at the pick-up location 64, the chuck descends a distance sufficient to receive the valve between the jaw members 67, 68 and 69. The coil spring 70 on the chuck urges the jaw members into gripping relationship with the valve, and the chuck is raised slightly as it moves around the turret to carry the valve away from the pick-up location 64.

Shortly after each chuck 65 begins its descent to pick up a valve 30, the spindle portion 76 of the corresponding extension guide mechanism 75 is pivoted in a clockwise direction, as viewed in FIG. 12, in response to the control cam 88, through an angle which illustratively is forty degrees. The pivotal movement of the portion 76 brings one of the finger members 80 and 81 into contact with the dip tube extension 32 of the valve to align the extension with the container therebeneath. Immediately following the gripping of the valve by the jaw members 67, 68 and 69 of the chuck, the pivotal motion of the portion 76 is completed, and the fingers 80 and 81 are in contact with each other in guiding relationship with the upper portion of the dip tube 32. At this point in the operation cycle, both the chuck 65 and the guide mechanism 75 are in close vertical juxtaposition with each other adjacent the upper portions of their paths of movement, with the guide aperture 85 surrounding the upper portion of the dip tube a short distance below the jaws of the chuck.

Immediately after the finger members 80 and 81 move into guiding relationship with the dip tube extension 32, the extension guide mechanism 75 descends toward the can 31 therebeneath under the control of the stationary cam 88. During this downward movement, the stationary cam 87 maintains the corresponding chuck 65 adjacent its uppermost position. As the mechanism 75 descends, the dip tube 32 slides in the guide aperture 85 between the fingers 80 and 81 until the fingers are disposed just above the lower end of the dip tube immediately above the open mouth of the can.

As soon as the downward movement of the extension guide mechanism 75 is completed, the corresponding chuck 65 begins its descent in response to the stationary cam 87. When the chuck 65 has moved downwardly a distance sufficient to insert the lower end of the dip tube 32 into the mouth of the can, the stationary cam 88 is effective to pivot the spindle portion 76 of the guide mechanism 75 in a counterclockwise direction, as viewed in FIG. 12, relative to the turret 35. The pivotal motion of the spindle portion 76 swings the finger members 80 and 81 to their open positions and carries the offset portion 77 of the mechanism 75 a sufficient distance away from the descending chuck to provide adequate clearance as the chuck reaches the level of the offset portion. The downward movement of the chuck takes place during the rotation of the turret from its ninety-degree position to approximately its one hundred eighty-degree position.

As the descending chuck 65 contacts the can 31 therebeneath, the downward motion of the jaws 67, 68 and 69 is arrested. The main body portion of the chuck 65 continues to move downwardly for a short distance, however, to release the inwardly directed force of the spring 70 on the jaws 67, 68 and 69 and to transfer all of the thrust of the spring to resiliently bias the jaws in a vertically downward direction. This vertical biasing force urges the valve 30 firmly against the can 31 to seat the valve in place.

Shortly before the termination of the downward movement of the main body portion of the chuck 65, a stripper member 95 (FIGS. 20-22) within the chuck descends relative to the now stationary jaw members 67, 68 and 69 to cam the jaw members outwardly to their fully open positions. Although the stripper member 95 at no point comes in contact with the valve 30 during the seating operation, the stripper member urges the jaw members 67, 68 and 69 apart during the time the spring 70 maintains its vertical seating force against the jaw members. Shortly after the jaw members move to their open positions, the vertical seating force is released, and the descent of the body portion of the chuck is terminated in response to the stationary cam 87.

As the turret 35 rotates through its one hundred and thirteen degree position, the extension guide mechanism 75 is raised by the stationary cam 88 in preparation for the guiding of a succeeding dip tube 32 into its container. The ascent of the corresponding chuck 65 begins as the turret moves between its one hundred eighty-five and one hundred and ninety-degree positions. The guide mechanism 75 and the chuck 65 reach their uppermost locations as the turret rotates through two hundred fifty degrees and two hundred ninety degrees, respectively.

Just prior to the termination of the upward movement of the chuck 65, the stripper member 95 contacts a vertically stationary rod 96 (FIG. 22) to arrest the upward motion of the stripper member. The main body portion of the chuck 65 continues to rise, and the stripper member 95 moves between the jaw members 67, 68 and 69 to maintain them in their open positions and to strip any valve retained within the jaws as a result of such factors as the absence of a can beneath the chuck, for example. The thus stripped valve slides down a stationary chute 98 (FIG. 1) to a suitable hopper 99. As the chuck 65 again descends to receive a succeeding valve from the pick-up location 64, the stripper member 95 loses contact with the rod 96, and a coil spring 97 within the chuck pulls the member 95 upwardly relative to the jaw members 67, 68 and 69 to permit the jaw members to close into gripping engagement with the succeeding valve.

The valved cans 31 on the turret 35 are directed in succession by the rails 44 (FIG. 2) toward a pair of outfeed star wheels 100. The wheels 100 are coaxially mounted one above the other on a vertical shaft 102 adjacent the outfeed portion of the container feeding mechanism 34. Each of the wheels is provided with ten recesses 103 of a configuration corresponding to the cans 31. The wheels are continuously rotated in a counterclockwise direction, as viewed in FIG. 2, and the recesses 103 receive the cans from the turret and return them to the conveyor belt 33.

A detailed description of the machine will now be set forth.

EXTENSION GUIDE MECHANISM

As best shown in FIG. 12, the spindle portions 76 of the extension guide mechanisms 75 are reciprocably mounted on the turret 35 along a pitch circle which is the same as the pitch circle for the chucks 65. This pitch circle is tangent to the pitch circle of the recesses 63 (FIG. 2) in the valve star wheel 62. The spindle portions 76 are supported adjacent their corresponding chucks 65 in leading relationship therewith.

Each of the spindle portions 76 includes a splined tube 110 (FIG. 13) and a rod 111 movably positioned in the tube. Mounted adjacent the lower end of the tube 110 is a horizontally extending bracket 113 in fixed relationship with the tube. The outer end of the bracket 113 supports a vertical crank pin 115 which is offset from the axis of the tube 110 by a distance sufficient to permit the mechanism to clear the valve star wheel 62 (FIG. 2) as the turret 35 rotates. The upper end of pin 115 is rigidly affixed in a mating aperture in the bracket 113, while the lower end of the pin is connected to the lowermost finger member 81. The arrangement is such that the finger member 81, the pin 115, the bracket 113 and the tube 110 move as a unit in response to pivotal motion of the tube.

The lower end of the rod 111 is provided with a horizontally extending bracket 117 which is somewhat shorter than the tube bracket 113. The rod 111, and hence the bracket 117, are prevented from pivotal movement relative to the turret by a set screw 119 adjacent the protruding upper end of the rod. The linkage arm 84 is pivoted at one end to the outer end of the bracket 117 and at the other end to a connecting arm 122 in fixed relationship with the upper end of a depending sleeve 125. This sleeve surrounds the crank pin 115 and is pivotally movable with respect thereto. The lower end of the sleeve 125 is attached to the uppermost finger member 80.

Figure 3:
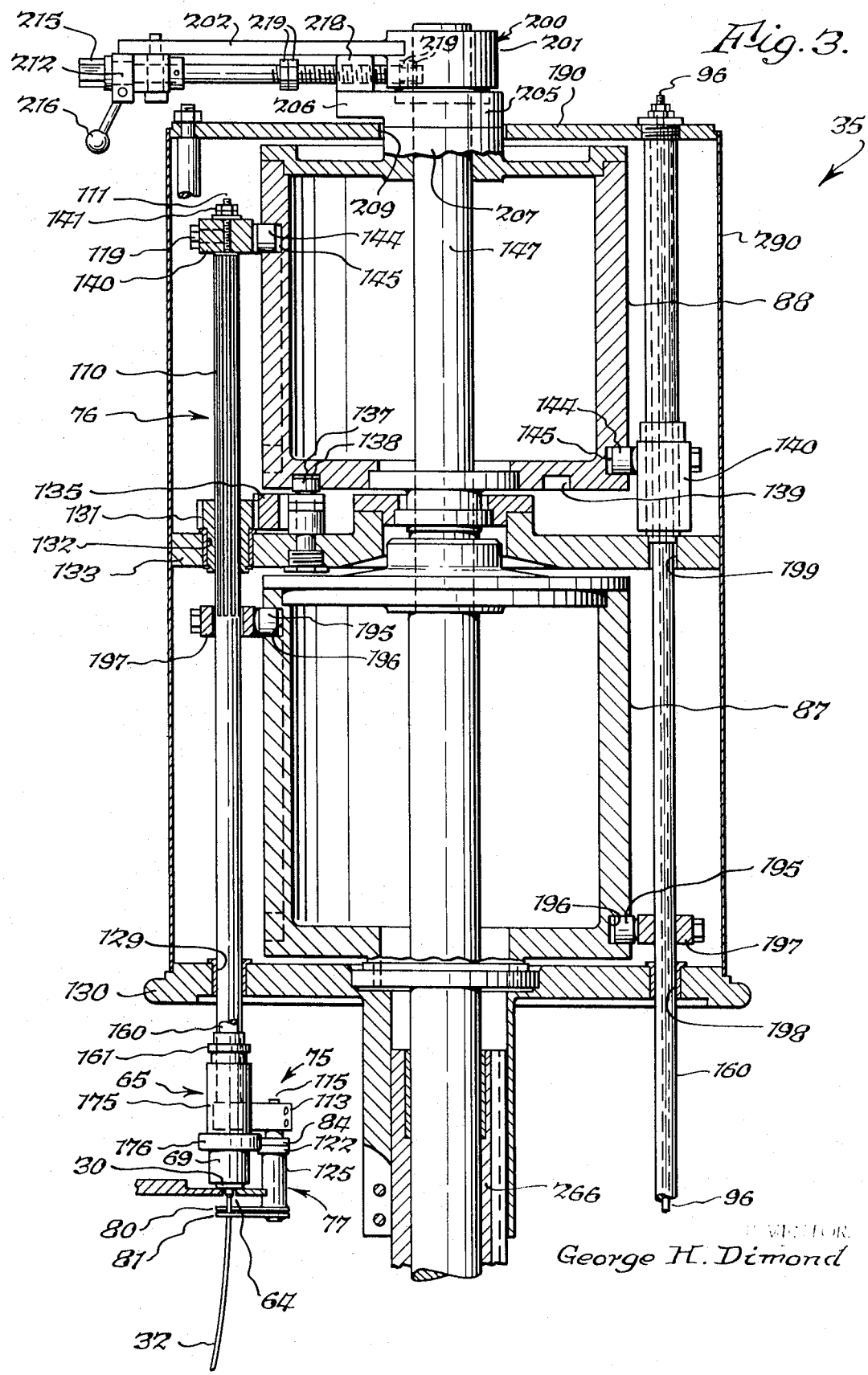
FIG. 3 is a vertical sectional view of the turret of the machine taken along the line 3—3 in FIG. 2, with some parts shown broken away and others omitted for purposes of clarity.

As best shown in FIGS. 3 and 15, each of the splined tubes 110 extends upwardly through a suitable aperture 129 in a lower turret plate 130. Slidably mounted on each tube 110 above the lower plate 130 is a spur gear 131. The gear 131 is rotatably carried in an aperture 132 in an intermediate turret plate 133, and the gear extends above the plate 133 in meshing engagement with a gear sector 135 pivotally supported on the upper surface of the plate. A roller 137 protrudes upwardly from the gear sector 135 and is disposed in a mating groove 138 in the lower surface of the stationary cam 88. The groove 138 is substantially circular but includes a portion 139 (FIG. 12) of decreased radius which extends throughout approximately one hundred degrees of the circle.

The upper end of the rod 111 protrudes above the corresponding end of the tube 110 and extends through a mating aperture in a bracket 140. The protruding portion of the rod 111 is threaded to receive two nuts 141 which, together with the set screw 119, hold the rod in rigid relationship with the bracket. As best shown in FIG. 15, the bracket 140 extends horizontally from the rod 111 and is slidably supported on the spindle portion of the adjacent chuck 65. A roller 144 extends inwardly from the bracket 140 intermediate its ends. This roller is disposed in a groove 145 in the outer cylindrical surface of the stationary cam 88. The groove 145 extends around the periphery of the cam 88 along a path represented schematically in FIG. 23 by the curve 91.

In a manner that will become more fully apparent hereinafter, the turret 35 is continuously rotated in a clockwise direction, as viewed in FIG. 12, about a stationary turret post 147 which supports the cylindrical cams 87 and 88. As the turret rotates, the individual rollers 144 follow the track of the cam groove 145 to move the splined tubes 110 and the corresponding rods 111 upwardly and downwardly relative to the turret, thus similarly moving the extension guide mechanisms 75. As each of the mechanisms 75 approaches the pick-up location 64, the groove 138 in the lower surface of the cam 88 moves the roller 137 inwardly to pivot the corresponding gear sector 135 counterclockwise through a small angle. The sector 135 pivots the meshing spur gear 131 and the splined tube 110 in a clockwise direction. The pivotal movement of the tube 110 is transmitted through the bracket 113 and the crank pin 115 to the lower finger member 81, thus moving the finger member 81 from its open position (the position shown by dash lines in FIG. 14) to its closed (full line) position. As the pin 115 swings about the axis of the tube 110, the linkage arm 84 actuates the upper finger member 80 to bring the finger into overlapping relationship with the finger 81.

Each of the finger members 80 and 81 includes a recess 149 adjacent its outer end, and as the finger members move toward their closed position the recesses 149 form the guide aperture 85. In most instances the dip tubes 32 to be applied to the cans 31 have a slight bend, and the swinging or sickle-like movement of the finger members about the axis of the tube 110 brings one of the finger members into contact with the tube prior to the other member. The member which initially contacts the tube brings it into vertical alignment with the mouth of the can, and the fingers close around the tube a short distance beneath the tube's upper end. The lower finger member 81 is provided with an upstanding stop pin 150 which ensures that the finger members come to rest in their closed position with the tube slidably disposed in the guide aperture.

Upon the movement of the finger members 80 and 81 into guiding relationship with the dip tube 32, the groove 145 in the cam 88 urges the roller 144 in a downward direction to lower the bracket 140, the tube 110, the rod 111, the various parts comprising the offset portion 77 and the finger members 80 and 81 to the positions shown in FIG. 15. During this downward movement, the bracket 140 slides along the spindle portion of the adjacent chuck 65, the tube 110 slides within the spur gear 131 and the finger members 80 and 81 slide along the vertically stationary dip tube 32. The downward movement is arrested with the finger members positioned immediately above the open mouth of the can 31.

Immediately following the completion of the downward movement of the finger members 80 and 81, and prior to the time the corresponding chuck 65 approaches the finger members, the cam groove 138 is effective to urge the roller 137 outwardly to its initial position. The outward motion of the roller 137 pivots the gear sector 135 in a clockwise direction, as viewed in FIG. 12, to rotate the spur gear 135 and the attached tube 110 counterclockwise, as viewed in this figure. The counterclockwise movement of the tube 110 swings the bracket 113, the crank pin 115 and the finger member 81 about the axis of the tube to carry the offset portion 77 of the guide mechanism 75 away from the path of the chuck 65 and to also provide clearance with respect to the valve star wheel 62 (FIG. 2). The movement of the tube 110 additionally actuates the linkage arm 84 to open the finger members 80 and 81 in preparation for the receipt of a succeeding dip tube 32 from the star wheel 62. The roller 144 in the cam groove 145 then returns the guide mechanism to its uppermost position.

CHUCK

The construction and mode of operation of the capping chucks 65 are similar in some respects to the chucks disclosed in George H. Dimond U.S. Pat. 2,811,002, but with several important differences. As best shown in FIGS. 15 and 16, each of the chucks 65 includes a vertically reciprocable spindle 160 which is carried by the turret 35. The lower end of the spindle 160 is threaded to accommodate a chuck body member 161. The body member 161 is in the form of a sleeve which extends in a downward direction from the spindle 160 and is provided with an external peripheral recess 162 adjacent its lower end to form an integral ledge 163. Each of the chuck jaw members 67, 68 and 69 includes an inwardly extending flange 164 which, in the position shown in FIG. 16, rests on the upper surface of the ledge 163.

An annular groove 167 of semi-circular cross-section surrounds the outer cylindrical surface of the body member 161 a short distance above the recess 162. The groove 167 is arranged to accommodate six balls 168 which are disposed in mating apertures in an interlock sleeve 170. The interlock sleeve 170 is slidably positioned around the body member 161 and is biased in a downward direction relative to the body member by the coil spring 70. This spring surrounds the body member 161 between the sleeve and the enlarged upper portion of the body member.

The coil spring 70, the body member 161 and the interlock sleeve 170 are substantially enclosed by a cylindrical housing 175. The housing 175 is of generally tubular configuration but is provided with an enlarged portion 176 at its lower end which supports the jaws 67, 68 and 69. Each of the jaws 67, 68 and 69 includes an integral peripheral portion 178 which extends a short distance above the jaw flange 164 and, in the position shown in FIG. 16, is in engagement with the inner horizontal surface of the enlarged portion 176. The peripheral portions 178 of the jaws are movably maintained within the portion 176 by a retaining ring 179. An internal shoulder 180 is located within the main body portion of the housing 175 a short distance above the portion 176. The inner wall of the housing slopes downwardly and outwardly from the shoulder 180 to the portion 176, for purposes that will become more fully apparent hereinafter.

The stripper 95 is slidably disposed within the body member 161 of the chuck 65 and protrudes from the lower end thereof in the form of a cylindrical stripper head 182. The diameter of the head 182 is greater than the distance between the chuck jaws 67, 68 and 69 when the jaws are in their fully closed position. The head 182 includes an enlarged upper flange 184 which is adapted to engage an internal ledge 185 on each jaw. The upper end of the stripper spring 97 bears against an enlarged head portion 187 of the stripper 95, while the lower end of the spring 97 is in contact with an internal ledge 188 on the body member 161.

As best shown in FIG. 22, the stripper rod 96 is coaxially disposed above the stripper 95 in position to engage the head portion 187. The rod 96 extends in an upward direction from the portion 187 through the hollow spindle 160 and is affixed at its upper end to the top plate 190 of the turret 35. With this arrangement, the rod 96 is axially stationary relative to the reciprocating stripper.

The vertical reciprocable movement of each of the chucks 65 is controlled by a roller 195 (FIG. 15) which rides in a groove 196 in the cylindrical surface of the stationary cam 87. This groove is disposed around the cam 87 along a path shown schematically in FIG. 23 by the curve 91. The roller 195 is carried intermediate the ends of a horizontal bracket 197. One end of the bracket 197 is affixed to the chuck spindle 160, while the other end is slidably disposed around the spindle portion 76 of the adjacent guide mechanism 75. The spindle 160 extends downwardly from the bracket 197 through an aperture 198 in the lower turret plate 130 and extends upwardly from the bracket through an aperture 199 in the intermediate turret plate 133. As the spindle 160 reciprocates in response to the roller 195, it slides in the apertures 198 and 199 and moves the chuck 65 along the path illustrated by the curve 91.

The positions of the various parts of the chuck 65 immediately prior to the receipt of a valve 30 from the pick-up location 64 are shown in FIG. 16. At this point in the operation cycle, the balls 168 rest on the internal shoulder 180 of the chuck housing 175, and the annular groove 167 in the body member 161 is disposed a short distance above the balls. The coil spring 70 exerts a downwardly directed force on the housing 175 through the interlock sleeve 170, the balls 168 and the shoulder 180. This force bears against the peripheral portions 178 of the jaw members 67, 68 and 69, and the inwardly directed flanges 164 of the jaw members are fulcrumed on the body member ledge 163. As a result, the jaw members 67, 68 and 69 are resiliently biased toward one another to their closed position and are urged against the lower beveled portion of the stripper head 182.

As the chuck 65 and its jaw members 67, 68 and 69 descend into contact with the valve 30 on the infeed star wheel 62 at the pick-up location 64, the jaw members are cammed outwardly by the cup portion of the valve and move to the positions shown in FIG. 20. Each of the jaw members includes a lower lip 192 which is located beneath the cup portion as the jaw members spread apart and then contract in response to the coil spring 70. During the ensuing slight upward movement of the chuck 65, the ledges 164 of the jaw members are maintained on their fulcrum 163, and the spring 70 continues to urge the jaw members inwardly into resilient engagement with the valve. The chuck picks up the valve from the location 64 and carries it along with the rotating turret.

During the ensuing downward movement of the chuck 65 to apply the valve 30 to the can 31 therebeneath, the lower lips 192 on the jaw members 67, 68 and 69 contact the can to arrest further downward motion of the jaw members. The chuck spindle 160 and the attached body member 161 overtravel slightly and continue their descent. As the ledge 163 on the member 161 moves beneath the jaw flanges 164, the jaw members lose their fulcrum, and the inwardly directed gripping force on the jaw members is released. The coil spring 70 continues to exert a vertically downward force on the jaw members, however, through the interlock sleeve 170, the balls 168, the shoulder 180, the chuck housing 175 and the peripheral portion 178 of the jaw members. This vertical force is effective to firmly seat the valve 30 on the can 31.

Slight further overtravel of the spindle 160 and the body member 161 causes the lower end of the member 161 to move the stripper head 182 downwardly relative to the vertically stationary jaw members 67, 68 and 69. The stripper head 182 moves between the jaw members and spreads them outwardly so that they no longer have radial contact with the valve 30. The jaws continue to bear vertically on the valve, however, to maintain the seating force.

Upon still further slight overtravel of the spindle 160 and the body member 161, the body member moves downwardly relative to the interlock sleeve 170 and the chuck housing 175 to the position shown in FIG. 21. In this position, the peripheral groove 167 in the member 161 is at the level of the balls 168. The balls 168 are biased inwardly by the sloping internal shoulder 180, and the balls move into the groove 167 until they are flush with the outer surface of the sleeve 170. Although the balls 168 no longer are effective to transmit any substantial downwardly directed seating thrust to the jaw members 67, 68 and 69 at this point in the operation cycle, they exert a frictional drag on the inner cylindrical surface of the housing 175. Because of the comparatively large space between the flange 164 and the internal ledge 185 on each jaw member, sufficient clearance is provided for still further overtravel so that the chuck will accommodate normal variations in the nominal height of the cans 31 without the necessity for adjusting the height of the turret. The descent of the spindle 160 and the body member 161 is arrested with the valve firmly seated on the can and with the jaw members in their fully open position.

During the ensuing elevation of the spindle 160 and the body member 161 in preparation for the receipt of a succeeding valve 30, the balls 168 exert a substantial and gradually increasing frictional drag on the housing 175 as a result of the sloping inner surface of the housing beneath the shoulder 180. The member 161, the housing 175 and the stripper 95 are thus retained in the same relative positions with the stripper head 182 between the jaw members 67, 68 and 69.

As the chuck 65 approaches its uppermost position, the head portion 187 of the stripper member 95 contacts the lower end of the stripper rod 96, thus arresting further upward movement of the stripper member. The spindle 160 and the chuck body 161 continue to raise the jaw members 67, 68 and 69 until the ledges 185 of the jaw members come in contact with the flange 184 on the stripper head 182, thus arresting further upward movement of the jaw members and the chuck housing 175. Upon further upward motion of the spindle 160 and the body 161, the fulcrum ledge 163 on the body 161 again contacts the jaw flanges 164, and the balls 168 are cammed outwardly from the groove 167 and return to their positions on the internal shoulder 180. At this point in the operation cycle, the disposition of the various parts is shown in FIG. 22 and is substantially the same as that of FIG. 16 except that the stripper head 182 in FIG. 22 is in a relatively lowered position between the jaw members. When the chuck again begins its descent to pick up a succeeding valve, the head portion 187 of the stripper loses contact with the lower end of the rod 96, and the stripper spring 97 moves the head 182 in an upward direction relative to the jaw members. The jaw members return to their fully closed positions as a result of the inwardly directed biasing force exerted by the spring 70.

ADJUSTMENT FOR DIP TUBE LENGTH

The relative disposition of the stationary cam grooves 138, 145 and 196 as represented by the respective curves 92, 90 and 91 in FIG. 23 is such that each of the chucks 65 and the associated guide mechanism 75 are oriented to apply closure elements having comparatively long dip tube extensions to the cans therebeneath. Depending upon the type of extensions to be inserted into the cans, the lengths of the extensions may vary over a wide range which illustratively may run from about two inches to about nine inches. Accordingly, it is highly advantageous to provide an apparatus which may be readily adapted to insert extensions of widely varying lengths.

The present apparatus is quickly and easily adjustable through the use of an adjustment mechanism 200 (FIGS. 3 and 11) in accordance with the lengths of the particular dip tubes or other extensions being inserted into the cans. This adjustment may be accomplished either with the turret 35 in motion or at rest and enables the application of an extremely wide variety of closure elements having dip tube extensions to the cans.

The adjustment mechanism 200 is mounted on the stationary turret post 147 immediately above the top plate 190 of the turret 35. The mechanism 200 includes a bracket 201 which is keyed or otherwise rigidly affixed to the post 147 and is provided with an elongated arm 202. This arm extends from the post 147 to a position located a short distance beyond the periphery of the turret.

Pivotally supported on the turret post 147 immediately beneath the arm bracket 201 is a second bracket 205. The bracket 205 includes a horizontally disposed arm 206, which is substantially shorter than the arm 202, and a depending sleeve portion 207. The turret top plate 190 is provided with a circular opening 209 surrounding the post 147, and the sleeve portion 207 extends downwardly through the opening 209 and is rigidly affixed to the guide mechanism cam 88. The cam 88 is carried within the upper portion of the turret 35 and is mounted for rotary movement relative to the post 147. The chuck cam 87, on the other hand, is disposed within the lower portion of the turret in fixed relationship with the post 147.

As best shown in FIG. 11, the outer end of the elongated arm 202 is pivotally connected to a sleeve member 212. The sleeve member 212 is externally disposed with respect to the periphery of the turret 35 and is slidably supported adjacent one end of an adjusting shaft 215. The member 212 is maintained in fixed but adjustable relationship with the shaft 215 by a manually operable knob 216.

The outer end of the short bracket arm 206 is pivotally connected to a second sleeve 218. This latter sleeve is disposed around a threaded portion of the adjusting shaft 215 in spaced relationship with the sleeve 212. The movement of the sleeve 218 along the shaft 212 is limited by spaced pairs of nuts 219.

To adjust the apparatus for the application of valves having comparatively short dip tubes, the hexagonal head of the adjusting shaft 215 is rotated by a suitable tool (not shown) to move the threaded sleeve 218 from its full line position (FIG. 11) to the position shown in dotted lines, for example. The sleeve 218 urges the arm 206 and the attached bracket 205 in a clockwise direction, as viewed in FIG. 11, to rotate the attached guide mechanism cam 88 (FIG. 3) relative to the chuck cam 87. The rotary movement of the cam 88 shifts the cam grooves 138 and 145 in a lateral direction relative to the cam groove 196 on the chuck cam 87. The disposition of the thus shifted groove 138 is shown schematically in FIG. 23 by the dash line 225, while that of the groove 145 is represented by the dash line 226.

With the cam 88 in its shifted position, the descent of the extension guide mechanism 75 is retarded until just prior to the time the corresponding chuck 65 begins to move downwardly to apply a valve to the container therebeneath. The pivotal movement of the spindle portion 76 of the guide mechanism 75 similarly is retarded relative to the downward movement of the chuck, and the fingers 80 and 81 close around the dip tube shortly before the chuck begins its descent. With this arrangement, the chuck and the guide mechanism move downwardly together toward the cam in closely spaced relationship with each other, and there is little relative motion between the dip tube and the descending fingers until the fingers reach their lowermost positions. As a result, even comparatively short dip tubes are positively guided into the mouths of their containers.

As soon as the descent of the guide mechanism 75 is arrested, the spindle portion 76 is pivoted to return the finger members 80 and 81 to their open positions and to swing the offset portion 77 of the guide mechanism away from the path of the descending chuck. Immediately thereafter, the chuck reaches the bottom of its movement and applies the valve to the can in a manner similar to that described heretofore.

TRANSFER MECHANISM

The transfer mechanisms 54 and 55 (FIG. 2) are supported by a vertical post 230 which is best shown in FIG. 5. The post 230 is mounted adjacent the infeed star wheel shaft 39 and is maintained in fixed relationship with the axis of the shaft by an arm 232. The upper end of the post 230 is provided with a horizontal transfer arm 235. As best shown in FIG. 2, the arm 235 extends toward the container feeding mechanism 34 from the post 230 in supporting relationship with the transfer mechanisms 54 and 55.

The transfer mechanisms 54 and 55 are of substantially identical construction. Each of the mechanisms includes a plate 240 (FIG. 7) affixed to the lower surface of the transfer arm 235 and a bracket 241 mounted on the upper surface of the transfer arm. The bracket 241 is provided with a horizontal bore 242 which accommodates a rod 244 and a surrounding coil spring 245. The rod 244 and the spring 245 are radially disposed with respect to the valve cams 58 and 59 (FIG. 2). The inner end of the rod 244 for the transfer mechanism 54 is connected to a bracket 247 carrying a cam roller 248, and the inner end of the rod 244 for the transfer mechanism 55 is connected to a similar bracket 249 carrying a cam roller 250. The roller 248 rides on the lower cam 58, and the roller 250 rides on the upper cam 59. The inner end of the coil spring 245 for each transfer mechanism bears against the corresponding bracket 247 or 249, while the outer end of each spring is held stationary. The arrangement is such that each spring resiliently urges the corresponding roller against its cam.

Mounted in fixed relationship with the rod 244 intermediate its ends is a depending bracket 252 which supports a pusher 253. As best shown in FIGS. 7-10, the pusher 253 is in the form of a flat plate which includes a cutout portion 254 of a configuration similar to the silhousette of the valves 30. The pusher 253 is radially disposed with respect to the valve star wheel 62 and is slidable from a full line position (FIG. 7), in whch the cutout portion 254 is in alignment with the recesses 63 in the wheel 62, and a dash line position, in which the portion 254 is aligned with the lower end of the corresponding valve chute 52 or 53.

The star wheel shaft 39 is continuously rotated in a counterclockwise direction, as viewed in FIG. 2, to similarly rotate the cams 58 and 59. Each of the cams 58 and 59 includes five equally spaced recesses 256, with the result that the corresponding rollers 248 and 250 are each moved inwardly and then outwardly a total of five times for each revolution of the shaft 39. The relative disposition of the cams 58 and 59 is such that this movement takes place alternately, with first one roller and then the other moving toward the valve star wheel 62.

As the roller 248, for example, moves inwardly toward the star wheel 62 in response to one of the recesses 256 in the cam 58, the rod 244 similarly moves toward the star wheel to urge the depending bracket 252 and the attached pusher 253 away from the lower end of the chute 52. At the time the pusher 253 starts its inward movement, the lowermost valve 30 from the chute is disposed within the cutout portion 254, and the inwardly moving pusher carries the valve to the star wheel 62. The valve is directed by the star wheel along an arcuate path to the pick-up location 64. As soon as the valve is removed from the cutout portion 254 by the star wheel, the cam 58 and the roller 248 are effective to return the pusher to its initial position with the portion 254 at the lower end of the chute 52.

The arrangement is such that the transfer mechanisms 54 and 55 continuously feed the valves 30 to the star wheel 62 from first one and then the other of the cap sorters 50 and 51 (FIG. 1). The wheel 62 carries each of the alternately received valves to the pick-up location 64, where the valves are received by the successive chucks 65 in the manner described heretofore.

TURRET

Figure 4:
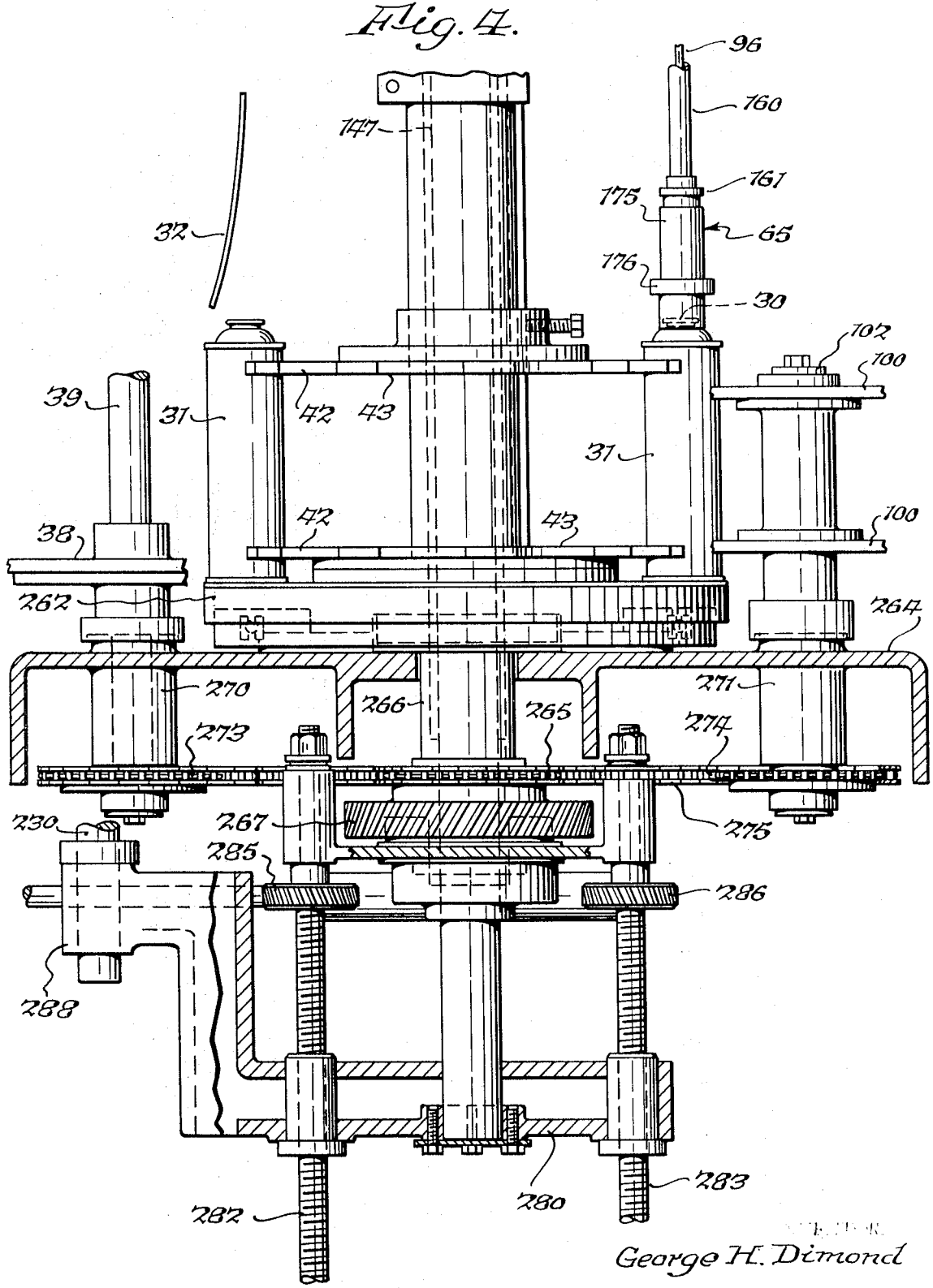
FIG. 4 is a vertical sectional view of the drive mechanism for the turret taken along the line 4—4 in FIG. 2, with portions broken away and in elevation.

As best shown in FIG. 4, the turret post 147 extends downwardly through suitable apertures in a circular can support plate 262 and a machine base 264. A drive sprocket 265 is slidably disposed on the post 147 beneath the base 264. The sprocket 265 is maintained in fixed relationship with the support plate 262 by a sleeve 266 which surrounds the post 147. The sprocket 265 is rotated at a constant speed by a drive gear 267.

The star wheel shafts 39 and 102 also extend through the machine base 264 on opposite sides of the turret post 147. The depending portions of the shafts 39 and 102 are rotatably disposed within fixed sleeves 270 and 271, respectively, which are attached to the lower surface of base 264. Rotatably carried at the lower end of the sleeves 270 and 271 are respective star wheel sprockets 273 and 274. These sprockets are maintained in driven relationship with the drive sprocket 265 by a chain 275. The path of the chain 275 around the various sprockets is shown by the broken line 277 in FIG. 2.

The lower end of the turret post 147 is affixed to a stationary casting 280. The casting 280 supports two threaded shafts 282 and 283 on opposite sides of the drive gear 267. These shafts are manually adjustable through the use of threaded members 285 and 286 to vary the relative spacing between the can support plate 262 and the chucks and guide mechanisms thereabove to accommodate containers which vary widely in height. The casting 280 includes an integrally formed arm 288 which supports the stationary transfer mechanism post 230.

The sleeve 266 protrudes above the machine base 264 and is maintained in fixed relationship with the lower turret plate 130 (FIG. 3). The turret plates 130, 133 and 190 rotate as a unit and are surrounded by a removable cover 290 which encloses the various mechanisms within the turret.

Upon the rotation of the drive gear 267, the sprocket 265 is similarly rotated to transmit driving power to the star wheel shafts 39 and 102 by means of the chain 275 and the sprockets 273 and 274. As the drive gear 267 rotates, the sleeve 266 is effective to rotate the can support plate 262 and the lower turret plate 130, thus driving the turret and carrying the various chucks and guide mechanisms around the stationary cams 87 and 88. The turret and the can support plate are driven as a unit to maintain the cans on the plate in synchronized relationship with the chucks on the turret.

Although the apparatus has been described as having particular utility in the application of the valves 30 to the aerosol cans 31 and the insertion of the dip tubes 32 of the valves within the mouths of the cans, it will be readily apparent that various other types of closure elements may be applied to a wide variety of containers in accordance with the invention. As an illustration, the apparatus may be utilized to apply closure elements having brush-type applicators or other extensions to jars, bottles, etc.

The terms and expressions which have been employed are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. A machine for applying closure elements having extensions to a series of containers presented therebeneath, comprising, in combination:
   means for directing successive containers along a feed path;
   closure receiving means reciprocably positioned above and in substantial vertical alignment with a container along said feed path;
   a vertically reciprocable extension guide mechanism mounted above said feed path adjacent said closure receiving means, said guide mechanism including extension directing means adjacent the lower end thereof and movable into guiding relationship with the extension of a closure element;
   a source of closure elements having extensions;
   means for feeding a closure element from said source to said closure receiving means;
   first control means for moving said closure receiving means in a downward direction to apply the received closure element to the container therebeneath; and
   second control means for moving said extension directing means into guiding relationship with the extension of the received closure element and for moving said guide mechanism in a downward direction while said extension directing means is in said guiding relationship, said extension directing means guiding said extension into said container during the downward movement of said closure receiving means.

2. A machine of the character set forth in claim 1, in which said extension guide mechanism includes a pivotally mounted spindle portion, and said extension directing means includes a pair of overlapping finger members and linkage means for movably connecting one of said finger members to said spindle portion, the other of said finger members being in fixed relationship with said spindle portion, said finger members being movable toward and away from one another in response to pivotal movement of the guide mechanism to periodically form a guide aperture for directing the extension of said received closure element into said container.

3. A machine of the character set forth in claim 1, in which the means for directing the containers along said feed path includes a rotary turret, and the closure receiving means includes a vertically reciprocable chuck mounted on said turret, said first and second control means comprising stationary cam means for controlling the vertically reciprocable movement of said chuck and said extension guide mechanism.

4. A machine for applying closure elements having extensions to a series of containers presented therebeneath, comprising, in combination:
   means for directing successive containers along a feed path;
   closure receiving means positioned for vertically reciprocable movement above and in substantial vertical alignment with a container along said feed path;
   a vertically reciprocable extension guide mechanism pivotally mounted above said feed path adjacent said closure receiving means, said guide mechanism having a vertical spindle portion and a pair of overlapping finger members carried adjacent the lower end of said spindle portion, said finger members being movable toward and away from one another in response to pivotal movement of the guide mechanism to periodically form a guide aperture;
   a source of closure elements having extensions;
   means for feeding a closure element from said source to said closure receiving means;
   first control means for moving said closure receiving means in a downward direction to apply the received closure element to the container therebeneath; and
   second control means for moving said extension guide mechanism in a downward direction and for pivoting said mechanism to move the finger members thereof toward one another and thereby form said closure element guide aperture, the extension of the closure element being guided into the container by said guide aperture during the downward movement of said closure receiving means.

5. A machine for applying closure elements having extensions to a series of containers presented therebeneath, comprising, in combination:
   means for directing successive containers along a feed path;
   closure receiving means positioned for vertically reciprocable movement above and in substantial vertical alignment with a container along said feed path;
   a vertically reciprocable extension guide mechanism pivotally mounted above said feed path adjacent said closure receiving means, said guide mechanism having a vertical spindle portion, a lower portion offset with respect to said spindle portion, a pair of overlapping finger members carried adjacent the lower end of said offset portion, and linkage means for pivotally interconnecting one of said finger members to said spindle portion, the other of said finger members being in fixed relationship with said spindle portion, said finger members being movable toward and away from one another in response to pivotal movement of the guide mechanism to periodically form a guide aperture;
   a source of closure elements having extensions;
   means for feeding a closure element from said source to said closure receiving means;
   first control means for moving said closure receiving means in a downward direction to apply the received closure element to the container therebeneath; and
   second control means for moving said extension guide mechanism in a downward direction prior to the termination of the downward movement of said closure receiving means and for pivoting said mechanism to move the finger members thereof toward one another and thereby form said guide aperture, the extension of the closure element being guided into the container by said guide aperture.

6. A machine for applying closure elements having extensions to a series of containers presented therebeneath, comprising, in combination:
   means for directing successive containers along a feed path;
   closure receiving means positioned for vertically reciprocable movement above and in substantial vertical alignment with a container along said feed path, said closure receiving means having jaw means at the lower end thereof and operating means for controlling said jaw means;
   a vertically reciprocable extension guide mechanism pivotally mounted above said feed path adjacent said closure receiving means, said guide mechanism having a vertical spindle portion and extension directing means carried adjacent the lower end of said spindle portion, said extension directing means being movable into guiding relationship with the extension of a closure element in response to pivotal movement of said guide mechanism;

a source of closure elements having extensions;

means for feeding a closure element from said source to said closure receiving means;

first control means for moving said closure receiving means in a downward direction to apply the received closure element to the container therebeneath, said operating means maintaining said jaw means in gripping engagement with the closure element during said downward movement and exerting a resilient vertical seating force on the jaw means as the closure element contacts the container; and second control means for moving said extension guide mechanism in a downward direction and for pivoting said mechanism to move said extension directing means into guiding relationship with the extension of the closure element received by said closure receiving means, the extension of the received closure element being guided into the container by said guide aperture during the downward movement of said receiving means.

7. A machine for applying closure elements having extensions to a series of containers presented therebeneath, comprising, in combination:

means for directing successive containers along a feed path;

closure receiving means positioned for vertically reciprocable movement above and in substantial vertical alignment with a container along said feed path, said closure receiving means having jaw means at the lower end thereof and operating means for controlling said jaw means;

a vertically reciprocable extension guide mechanism pivotally mounted above said feed path adjacent said closure receiving means, said guide mechanism having a vertical spindle portion, a lower portion offset with respect to said spindle portion, a pair of overlapping finger members carried adjacent the lower end of said offset portion, and linkage means for pivotally interconnecting one of said finger members to said spindle portion, the other of said finger members being in fixed relationship with said spindle portion, said finger members being movable toward and away from one another in response to pivotal movement of the guide mechanism to periodically form a guide aperture;

a source of closure elements having extensions;

means for feeding a closure element from said source to said closure receiving means;

first control means for moving said closure receiving means in a downward direction to apply the received closure element to the container therebeneath, said operating means maintaining said jaw means in gripping engagement with the closure element during said downward movement and exerting a resilient vertical seating force on the jaw means as the closure element contacts its container; and second control means for moving said extension guide mechanism in a downward direction and for pivoting said mechanism to move the finger members thereof toward one another and thereby form said guide aperture, the extension of the closure element being guided into the container by said guide aperture during the downward movement of said closure receiving means.

8. A machine of the character set forth in claim 7, in which the source of closure elements comprises a pair of spaced-apart supply means, and means for alternately feeding closure elements from the respective supply means to said closure receiving means.

9. A machine of the character set forth in claim 8, in which said first and second control means respectively comprise first and second cams for controlling the movements of said closure receiving means and said extension guide mechanism in predetermined relationship with each other.

10. A machine for the character set forth in claim 9, further comprising means for adjusting the position of one of said cams relative to the other cam, to thereby vary the predetermined relationship between the movements of said closure receiving means and said extension guide mechanism.

11. A machine for applying closure elements having extensions to a series of containers presented therebeneath, comprising, in combination:

means including a rotary turret for directing successive containers along a feed path;

a plurality of vertically reciprocable chucks mounted on said turret and respectively positioned above and in substantial vertical alignment with said containers;

a plurality of vertically reciprocable extension guide mechanisms pivotally mounted on said turret, a separate one of said guide mechanisms being positioned adjacent each of said chucks and each of said guide mechanism having extension directing means movable into guiding relationship with the extension of a closure element;

supply means containing closure elements having guide elements;

means for successively feeding closure elements from said supply means to the respective chucks on said turret;

means for rotating said turret;

first control means responsive to the rotation of said turret for moving each of said chucks in a downward direction to apply its closure element to the container therebeneath; and second control means responsive to the rotation of said turret for moving each of said extension guide mechanisms in a downward direction and for moving the extension directing means thereof into guiding relationship with the extension of the closure element received by the adjacent chuck, said extension directing means guiding said extension into the container therefor during the descent of the adjacent chuck.

12. A machine for applying closure elements having extensions to a series of containers presented therebeneath, comprising, in combination:

means including a rotary turret for directing successive containers along a feed path;

conveyor means for advancing the containers to said turret;

a plurality of vertically reciprocable chucks mounted on said turret and respectively positioned above and in substantial vertical alignment with said containers;

a plurality of vertically reciprocable extension guide mechanisms mounted on said turret, a separate one of said guide mechanisms being positioned adjacent each of said chucks and each of said guide mechanisms having a vertical spindle portion and a pair of finger members carried adjacent the lower end of said spindle portion, the finger members in each pair being movable toward and away from one another to periodically form a guide aperture;

supply means containing closure elements having guide elements;

means for successively feeding closure elements from said supply mean to the respective chucks on said turret;

first control means responsive to the rotation of said turret for moving each of said chucks in a downward direction to apply its closure element to the container therebeneath; and second control means responsive to the rotation of said turret for moving each of said extension guide mechanisms in a downward direction and for moving the finger members thereof toward one another to thereby form said guide aperture, the extension of the closure element gripped by said corresponding chuck being guided into the container therefor by said guide aperture.

13. A machine for applying closure elements having extensions to a series of containers presented therebeneath, comprising, in combination:

means including a rotary turret for directing successive containers along a feed path;

conveyor means for advancing the containers to said turret;

a plurality of vertically reciprocable chucks mounted on said turret and respectively positioned above and in substantial vertical alignment with said containers;

a plurality of vertically reciprocable extension guide mechanisms pivotally mounted on said turret, a separate one of said guide mechanisms being positioned adjacent each of said chucks and each of said guide mechanisms having a vertical spindle portion, a lower portion offset with respect to said spindle portion, a pair of overlapping finger members carried adjacent the lower end of said offset portion, and linkage means for pivotally interconnecting one of said finger members to said spindle portion, the other of said finger members being in fixed relationship with said spindle portion, the finger members in each pair being movable toward and away from one another in response to pivotal movement of the corresponding guide mechanism to periodically form a guide aperture;

supply means containing closure elements having guide elements;

means for successively feeding closure elements from said supply means to the respective chucks on said turret;

means for rotating said turret;

first control means responsive to the rotation of said turret for moving each of said chucks in a downward direction to apply its closure element to the container therebeneath; and second control means responsive to the rotation of said turret for moving each of said etxension guide mechanisms in a downward direction and for pivoting each said mechanism to move the finger members thereof toward one another and thereby form said guide aperture, the extension of the closure element gripped by said corresponding chuck being guided into the container therefor by said guide aperture.

14. A machine of the character set forth in claim 13, in which said supply means comprises a pair of spaced-apart sources for said closure elements, and the feeding means is adapted to alternately feed closure elements from said sources to said chucks.

15. A machine for applying closure elements having extensions to a series of containers presented therebeneath, in combination:

means including a rotary turret for directing successive containers along a feed path;

conveyor means for advancing the containers to said turret;

a plurality of vertically reciprocable chucks mounted on said turret and respectively positioned above and in substantial vertical alignment with said containers, each of said chucks having jaw means at the lower end thereof and operating means for controlling said jaw means;

a plurality of vertically reciprocable extension guide mechanisms mounted on said turret, a separate one of said guide mechanisms being positioned adjacent each of said chucks and each of said guide mechanisms having extension directing means movable into guiding relationship with the extension of a closure element;

supply means containing closure elements having guide elements;

means for successively feeding closure elements from said supply means to the respective chucks on said turret;

means for rotating said turret;

first control means responsive to the rotation of said turret for moving each of said chucks in a downward direction to receive a closure element from the feeding means and for then continuing the downward movement of each chuck to apply the received closure element to the container therebeneath, the operating means on each chuck maintaining the chuck's jaw means in gripping engagement with the closure element during said downward movement; and second control means responsive to the rotation of said turret for moving each of said extension guide mechanisms in a downward direction and for moving the extension directing means thereof into guiding relationship with the extension of the closure element received by the adjacent chuck, said extension directing means guiding said extension into the container therefor during the descent of the adjacent chuck.

16. A machine of the character set forth in claim 15, in which said first control means is effective to move each of said chucks in an upward direction subsequent to the application of the closure member received thereby to its container, and in which said operating means includes stripper means for holding said jaw means in an open position during at least a portion of the chuck's upward movement.

17. A machine for applying closure elements having extensions to a series of containers presented therebeneath, comprising, in combination:

means including a rotary turret for directing successive containers along a feed path;

conveyor means for advancing the containers to said turret;

a plurality of vertically reciprocable chucks mounted on said turret and respectively positioned above and in substantial vertical alignment with said containers, each of said chucks having jaw means at the lower end thereof and operating means including a spring member for controlling said jaw means;

a plurality of vertically reciprocable extension guide mechanisms mounted on said turret, a separate one of said guide mechanisms being positioned adjacent each of said chucks and each of said guide mechanisms having extension directing means movable into guiding relationship with the extension of a closure element;

supply means containing closure elements having guide elements;

means for successively feeding closure elements from said supply means to a predetermined pick-up position adjacent said turret;

means for rotating said turret, to carry said chucks past said pick-up position, each said chuck being disposed above and in substantial vertical alignment with a closure element at said pick-up position as the chuck moves past said position;

first control means responsive to the rotation of said turret for moving each of said chucks in a downward direction to said pick-up position to grip a closure element and for then continuing the downward movement of each chuck to apply the gripped closure element to the container therebeneath, the spring member on each chuck maintaining the chuck's jaw means in gripping engagement with the closure element during said downward movement and the spring member also exerting a resilient vertical seating force on the jaw means as the closure element contacts its container; and second control means responsive to the rotation of said turret for moving each of said extension guide mechanisms in a downward direction and for moving the extension directing means thereof into guiding relationship with the extension of the closure element received by the adjacent chuck, said extension directing means guiding said extension into the container therefor during the descent of the adjacent chuck.

18. A machine of the character set forth in claim 17, in which the operating means for each of said chucks includes release means automatically responsive to the lowering of the chuck's jaw means into contact with a container for actuating the corresponding spring member to release the gripping engagement with said closure element but to maintain said resilient vertical seating force.

19. A machine of the character set forth in claim 18, in which said jaw means comprises a plurality of jaw members disposed about said closure element, each of said jaw members having an inwardly directed flange positioned at a level above said closure element, and in which said release means includes a fulcrum support for said flange and means for moving said support away from said flange to release said gripping engagement.

20. A machine of the character set forth in claim 18, in which the operating means for each of said chucks includes additional release means for actuating the corresponding spring member to release said resilient vertical seating force subsequent to the release of said gripping engagement.

21. A machine of the character set forth in claim 20, in which said additional release means comprises a housing in contact with said jaw means and including shoulder means adjacent said spring member, a series of balls normally biased into engagement with said shoulder means by said spring member, and means for moving said balls off said shoulder means to release the resilient vertical seating force on said jaw means.

22. A machine for applying closure elements having extensions to a series of containers presented therebeneath, comprising, in combination:
means including a rotary turret for directing successive containers along a feed path;
conveyor means for advancing the containers to said turret;
a plurality of vertically reciprocable chucks mounted on said turret and respectively positioned above and in substantial vertical alignment with said containers, each of said chucks having jaw means at the lower end thereof and operating means for controlling said jaw means;
a plurality of vertically reciprocable extension guide mechanisms pivotally mounted on said turret, a separate one of said guide mechanisms being positioned adjacent each of said chucks on the side thereof toward the direction of rotation of said turret, each of said guide mechanisms having a vertical spindle portion and a pair of finger members carried adjacent the lower end of said spindle portion, the finger members in each pair being movable toward and away from one another in response to pivotal movement of the corresponding guide mechanism to periodically form a guide aperture;
supply means containing closure elements having guide elements;
means for successively feeding closure elements from said supply means to a predetermined pick-up position adjacent said turret;
means for rotating said turret, to carry said chucks past said pick-up position, each said chuck being disposed above and in substantial vertical alignment with a closure element at said pick-up position as the chuck moves past said position;
first control means responsive to the rotation of said turret for moving each of said chucks in a downward direction to said pick-up position to grip a closure element and for then continuing the downward movement of each chuck to apply the gripped closure element to the container therebeneath, the operating means on each chuck maintaining the chuck's jaw means in gripping engagement with the closure element during said downward movement and the operating means also exerting a vertical seating force on the jaw means as the closure element contacts its container; and
second control means responsive to the rotation of said turret for moving each of said extension guide mechanisms in a downward direction and for pivoting each said mechanism to move the finger members thereof toward one another and thereby form said guide aperture, the extension of the closure element gripped by said corresponding chuck being guided into the container therefor by said guide aperture.

23. A machine of the character set forth in claim 22, in which said first and second control means respectively comprise first and second stationary cylindrical cams mounted one above the other in coaxial relationship with said turret.

24. A machine of the character set forth in claim 23, in which said first cam includes a first groove for controlling the vertically reciprocable movement of said chucks, and said second cam includes second and third grooves for respectively controlling the vertically reciprocable movement and the pivotal movement of said extension guide mechanisms.

25. A machine for applying closure elements having extensions to a series of containers presented therebeneath, comprising, in combination:
means including a rotary turret for directing successive containers along a feed path;
conveyor means for advancing the containers to said turret;
a plurality of vertically reciprocable chucks mounted on said turret and respectively positioned above and in substantial vertical alignment with said containers, each of said chucks having jaw means at the lower end thereof and operating means including a spring member for opening and closing said jaw means;
a plurality of vertically reciprocable extension guide mechanisms pivotally mounted on said turret, a separate one of said guide mechanisms being positioned adjacent each of said chucks on the side thereof toward the direction of rotation of said turret, each of said guide mechanisms having a vertical spindle portion, a lower portion offset with respect to said spindle portion and a pair of overlapping finger members carried adjacent the lower end of said offset portion, the finger members in each pair being movable toward and away from one another in response to pivotal movement of the corresponding guide mechanism to periodically form a guide aperture;
supply means containing closure elements having guide elements;
means for successively feeding closure elements from said supply means to a predetermined pick-up position adjacent said turret;
means for rotating said turret, to carry said chucks past said pick-up position, each said chuck being disposed above and in substantial vertical alignment with a closure element at said pick-up position as the chuck moves past said position;
first control means responsive to the rotation of said turret for moving each of said chucks in a downward direction to said pick-up position to grip a closure element and for then continuing the downward movement of each chuck to apply the gripped closure element to the container therebeneath, the spring member on each chuck maintaining the chuck's jaw means in gripping engagement with the closure element during said downward movement and the spring member also exerting a resilient vertical seating force on the jaw means as the closure element contacts its container; and
second control means responsive to the rotation of said turret for moving each of said extension guide mechanisms in a downward direction and for pivoting each said mechanism to move the finger members thereof toward one another and thereby form said guide aperture, the extension of the closure element gripped by said corresponding chuck being guided into the container therefor by said guide aperture.

26. A machine for applying closure elements having extensions to a series of containers presented therebeneath, comprising, in combination:

means including a rotary turret for directing successive containers along a feed path;

conveyor means for advancing the containers to said turret a plurality of vertically reciprocable chucks mounted on said turret and respectively positioned above and in substantial vertical alignment with said containers, each of said chucks having jaw means at the lower end thereof and operating means including a spring member for opening and closing said jaw means;

a plurality of vertically reciprocable extension guide mechanisms pivotally mounted on said turret, a separate one of said guide mechanisms being positioned adjacent each of said chucks on the side thereof toward the direction of rotation of said turret, each of said guide mechanisms having a vertical spindle portion, a lower portion offset with respect to said spindle portion, a pair of overlapping finger members carried adjacent the lower end of said offset portion, and linkage means for pivotally interconnecting one of said finger members to said spindle portion, the other of said finger members being in fixed relationship with said spindle portion, the finger members in each pair being movable toward and away from one another in response to pivotal movement of the corresponding guide mechanism to periodically form a guide aperture;

supply means containing closure elements having guide elements;

transfer means for successively feeding closure elements from said supply means to a predetermined pick-up position adjacent said turret;

means for rotating said turret, to carry said chucks past said pick-up position, each said chuck being disposed above and in substantial vertical alignment with a closure element at said pick-up position as the chuck moves past said position;

first control means responsive to the rotation of said turret for moving each of said chucks in a downward direction to said pick-up position to grip a closure element and for then continuing the downward movement of each chuck to apply the gripped closure element to the container therebeneath, the spring member on each chuck maintaining the chuck's jaw means in gripping engagement with the closure element during said downward movement and the spring member also exerting a resilient vertical seating force on the jaw means as the closure element contacts its container; and second control means responsive to the rotation of said turret for moving each of said extension guide mechanisms in a downward direction and for pivoting each said mechanism to move the finger members thereof toward one another and thereby form said guide aperture, the extension of the closure element gripped by said corresponding chuck being guided into the container therefor by said guide aperture.

27. A machine of the character set forth in claim 26, in which said transfer means comprises a closure star wheel for receiving the successive closure elements from said supply means and for advancing the same to said pick-up position.

28. A machine of the character set forth in claim 27, in which said conveyor means includes an infeed star wheel for advancing the containers to said turret, said infeed star wheel being mounted coaxially with said closure star wheel for rotation therewith.

29. A machine for applying closure elements having extensions to a series of containers presented therebeneath, comprising, in combination:

means including a rotary turret for directing successive containers along a feed path;

conveyor means for advancing the containers to said turret;

a plurality of vertically reciprocable chucks mounted on said turret and respectively positioned above and in substantial vertical alignment with said containers, each of said chucks having jaw means at the lower end thereof and operating means including a spring member for opening and closing said jaw means;

a plurality of vertically reciprocable extension guide mechanisms pivotally mounted on said turret, a separate one of said guide mechanisms being positioned adjacent each of said chucks on the side thereof toward the direction of rotation of said turret, each of said guide mechanisms having a vertical spindle portion, a lower portion offset with respect to said spindle portion, a pair of overlapping finger members carried adjacent the lower end of said offset portion, and linkage means for pivotally interconnecting one of said finger members to said spindle portion, the other of said finger members being in fixed relationship with said spindle portion, the finger members in each pair being movable toward and away from one another in response to pivotal movement of the corresponding guide mechanism to periodically form a guide aperture;

a pair of spaced-apart supply means containing closure elements having guide elements;

transfer means for alternately receiving closure elements from one and then the other of said supply means and for feeding said closure elements to a predetermined pick-up position adjacent said turret;

means for rotating said turret, to carry said chucks past said pick-up position, each said chuck being disposed above and in substantial vertical alignment with a closure element at said pick-up position as the chuck moves past said position;

first control means responsive to the rotation of said turret for moving each of said chucks in a downward direction to said pick-up position to grip a closure element and for then continuing the downward movement of each chuck to apply the gripped closure element to the container therebeneath, the spring member on each chuck maintaining the chuck's jaw means in gripping engagement with the closure element during said downward movement and the spring member also exerting a resilient vertical seating force on the jaw means as the closure element contacts its container; and second control means responsive to the rotation of said turret for moving each of said extension guide mechanisms in a downward direction and for pivoting each said mechanism to move the finger members thereof toward one another and thereby form said guide aperture, the extension of the closure element gripped by said corresponding chuck being guided into the container therefor by said guide aperture.

30. A machine of the character set forth in claim 29, in which said transfer means includes a pair of pusher members respectively positioned for reciprocable movement adjacent said supply means, and rotary cam means for alternately reciprocating said pusher members to withdraw successive closure elements from said supply means.

31. A machine of the character set forth in claim 30, in which said transfer means further includes a closure star wheel for receiving said closure elements from first one and then the other of said pusher members and for advancing the received elements to said pick-up location, and in which said conveyor means includes an infeed star wheel for advancing the containers to said turret, said infeed star wheel, said closure star wheel and said rotary cam means all being mounted in coaxial relationship with each other for rotation as a single unit.

References Cited
UNITED STATES PATENTS

| | | | | |
|---|---|---|---|---|
| 2,810,249 | 10/1957 | Wysocki | | 29—208 B |
| 3,112,562 | 12/1963 | Wilson | | 29—208 I |
| 3,118,218 | 1/1964 | Gleason | | 29—211 M |
| 3,141,278 | 7/1964 | Wysocki | | 29—208 B |
| 3,212,173 | 10/1965 | Wonneman | | 29—208 B |
| 3,248,785 | 5/1966 | Aidlin | | 29—208 B |
| 3,299,495 | 1/1967 | Wysocki | | 29—208 B |
| 3,352,455 | 11/1967 | Wysocki | | 221—167 |
| 3,407,964 | 10/1968 | Wysocki | | 221—167 |

JOHN F. CAMPBELL, Primary Examiner

D. P. ROONEY, Assistant Examiner

U.S. Cl. X.R.

29—208 F; 221—167